US012783730B1

(12) United States Patent
Bhalodia et al.

(10) Patent No.: US 12,783,730 B1
(45) Date of Patent: Nov. 3, 2026

(54) OBFUSCATING AND MEDIATING SENSITIVE CREDENTIALS FOR GENERATIVE AGENT ENVIRONMENTS

(71) Applicant: OpenAI OpCo, LLC, San Francisco, CA (US)

(72) Inventors: Viyat Bhalodia, Menlo Park, CA (US); Fotios Chantzis, San Francisco, CA (US); Winston Howes, Beverly Hills, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/562,153

(22) Filed: Mar. 10, 2026

(51) Int. Cl.
*G06F 21/62* (2013.01)
*H04L 9/08* (2006.01)
*H04L 9/32* (2006.01)

(52) U.S. Cl.
CPC ........ *G06F 21/6254* (2013.01); *H04L 9/0825* (2013.01); *H04L 9/3213* (2013.01)

(58) Field of Classification Search
CPC .. H04L 9/0825; H04L 9/3213; G06F 21/6254
See application file for complete search history.

(56) References Cited

U.S. PATENT DOCUMENTS 12,282,743 B2 * 4/2025 Kelkar .................. G06F 40/247
12,592,823 B1 * 3/2026 Manton ................. H04L 9/0819
12,641,064 B1 * 5/2026 Wilson ................ H04L 63/0428
2024/0185001 A1 * 6/2024 Nagaraju .............. G06F 40/284
2025/0139085 A1 * 5/2025 Mohammed .......... G06F 16/243
2025/0139382 A1 * 5/2025 Mohammed ............ G06F 40/40
2026/0104865 A1 * 4/2026 Gillies ...................... G06F 8/35
2026/0154179 A1 * 6/2026 Bachman ............ G06F 11/3608
2026/0154693 A1 * 6/2026 Palanisamy .......... G06Q 30/015

* cited by examiner

*Primary Examiner* — Azizul Choudhury
(74) *Attorney, Agent, or Firm* — Keller Preece PLLC

(57) ABSTRACT

This disclosure describes systems and methods for securely mediating access by generative artificial intelligence (AI) agent to external services without exposing sensitive credentials to the generative AI agent. The disclosed systems can store sensitive credentials within a secret store inaccessible to the generative model agent, generate opaque placeholder credentials bound to designated domains and request constraints, and inject the opaque placeholder credentials into the generative agent environment. The disclosed systems can intercept requests from the generative agent environment containing the opaque placeholder credentials, verify that the requests satisfy domain and request constraints, and replace the opaque placeholder credentials with cryptographic credentials derived from the sensitive credentials. The disclosed systems can provide the regenerated requests to external services and return outputs from the external services to the generative agent environment.

20 Claims, 13 Drawing Sheets

OBFUSCATING AND MEDIATING SENSITIVE CREDENTIALS FOR GENERATIVE AGENT ENVIRONMENTS

BACKGROUND

Recent advancements in large language model architectures, agentic task execution, and software integration tools have enabled systems to use generative model agents to perform tasks by interacting with third-party services on a user account's behalf. For instance, conventional systems increasingly utilize generative model agents to authenticate external APIs, access resources, and carry out operations that require sensitive authentication material such as API tokens, access keys, or signing credentials. Despite these developments, existing systems suffer from a number of technical deficiencies in relation to security and flexibility in enabling generative model agents to operate in environments involving sensitive authentication material.

As mentioned briefly above, conventional systems suffer from a number of technical disadvantages or deficiencies in securely utilizing generative model agents in connection with sensitive credentials. Specifically, conventional systems that use generative model agents to interact with external services often store sensitive credentials in the same runtime environment in which the agent processes prompts, constructs tool arguments, and generates intermediate outputs. Further, generative model agents used by conventional systems frequently invoke tools, subprocesses, and network destinations within a single workflow, resulting in sensitive strings traversing external logs, command histories, and memory buffers as part of ordinary execution state. As a result, conventional systems unnecessarily expose sensitive credentials across numerous execution layers and communication boundaries, thereby increasing the likelihood that malicious actors can access and extract those credentials.

Along these lines, conventional systems are susceptible to prompt injection from bad actors due to the inherent characteristics of generative agent environments. In particular, generative model agents interpret and prioritize natural language instructions by synthesizing system prompts, user inputs, retrieved content, and tool outputs within an agentic environment. As a result, conventional systems can sometimes allow externally supplied or indirectly embedded instructions to influence planning decisions, tool selection, and output generation of generative model agents. Thus, conventional systems are vulnerable to bad actors (or unintentional actors) who can inject prompts into agentic environments to manipulate a generative agent's reasoning process, redirect tool usage, or induce the disclosure or misuse of sensitive information under the guise of legitimate instructions.

In addition to security concerns, conventional systems also face challenges in flexibly enabling generative model agents to authenticate external services using sensitive credentials. Indeed, authentication requirements imposed by different external services vary in structure, protocol, and formatting conventions that do not align naturally with the generalized request-construction workflows used by generative model agents. In particular, external services implement heterogeneous authentication schemes and protocol-specific request semantics, which can require sensitive credentials to be applied in different locations and formats, or to be transformed through service-specific signing and validation steps. As a result, conventional systems often struggle to adapt to how sensitive authentication material is incorporated into outbound requests across different services.

SUMMARY

This disclosure describes one or more embodiments of systems, methods, and non-transitory computer-readable storage media that implement a secure mediation architecture configured to enable generative agent environments to leverage external services using sensitive authentication material without exposing the sensitive authentication material to generative model agents within the generative agent environments. Indeed, the disclosed systems can generate an opaque placeholder credential that obfuscates a sensitive credential and can provide the opaque placeholder credential for use within a generative agent environment in place of the sensitive credential. Furthermore, in some cases, the disclosed systems utilize an authorization translator to intercept outbound requests generated by the generative agent environment that include the opaque placeholder credential (which can indicate a designated domain and one or more request constraints associated with destination, request method, request path, headers, or body content of the outbound request). The disclosed systems can further utilize the authorization translator to retrieve the sensitive credential from a secret store and securely substitute the sensitive credential (or a derived authentication artifact generated using the sensitive credential) back for the opaque placeholder credential. In certain instances, the disclosed systems provide the sensitive request to the external service, receive a response from the external service, and/or provide an output corresponding to the response for display and/or interaction at a client device.

BRIEF DESCRIPTION OF THE DRAWINGS

This disclosure will describe one or more example implementations of the systems and methods with additional specificity and detail by referencing the accompanying figures. The following paragraphs briefly describe those figures.

DETAILED DESCRIPTION

This disclosure describes one or more embodiments of an agent secret mediation system configured to enable a generative model agent within a generative agent environment to securely invoke external services while preventing sensitive credentials from entering the generative agent environment. For example, the agent secret mediation system can determine agent configuration data (e.g., received from a client device) indicating a sensitive credential and a designated domain (e.g., network domain) for the sensitive credential. In certain instances, the agent secret mediation system generates an opaque placeholder credential indicating the designated domain and one or more corresponding request constraints while obfuscating the sensitive credential. Furthermore, the agent secret mediation system can inject the opaque placeholder credential into a generative agent environment so that the generative model agent constructs outbound requests using placeholder tokens rather than raw secrets while still retaining the ability to perform generative and agentic functions. In some cases, the agent secret mediation system mediates outbound requests (e.g., using an authorization translator) by parsing the outbound requests for placeholders, retrieving corresponding sensitive credentials from a secret store, and inserting the sensitive credentials (or encryptions or derived artifacts of the sensitive credentials) into the outbound requests. Moreover, the agent secret mediation system can forward the outbound requests to one or more approved external services in order to retrieve outputs from the external services.

Figure 1:
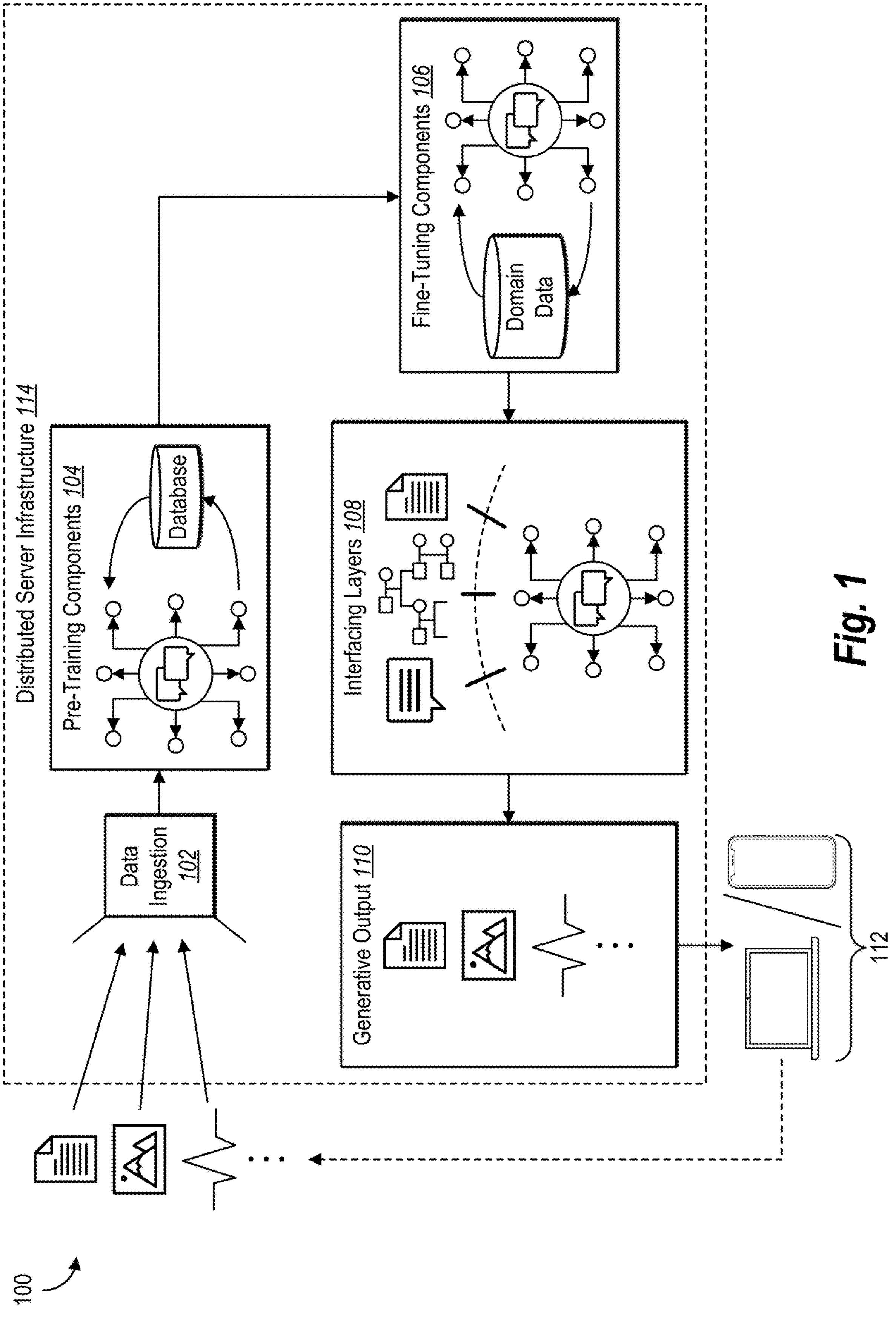
FIG. 1 illustrates a high-level architecture of a generative AI system in accordance with one or more embodiments.

FIG. 1 illustrates a high-level architecture of a generative AI system 100 for implementing large language models and other generative models to enable natural language processing, conversational interfaces, multimodal content generation, and analysis in accordance with one or more embodiments. The generative AI system 100 may include data ingestion pipelines 102, pre-training components 104, fine-tuning components 106, interfacing layers 108, and supporting hardware in the form of a distributed server infrastructure 114.

The data ingestion pipelines 102 of the generative AI system 100 may receive and preprocess large volumes of structured and unstructured data, including text corpora, image datasets, video datasets, and audio datasets, to support diverse generative model training. Preprocessing may include deduplication, tokenization, normalization, feature extraction (e.g., spectrogram generation for audio), and content safety filtering, preparing data for effective distributed training across server devices.

The pre-training components 104 of the generative AI system 100 may utilize transformer-based architectures for LLMs, as well as additional generative models such as diffusion models for image generation, autoencoders for representation learning, and multimodal transformer models for cross-domain generation tasks. These models may be configured with deep neural network stacks to capture hierarchical, semantic, and contextual relationships within the data.

The generative AI system 100 may employ diffusion models for image and video generation, where the models learn to iteratively denoise random noise into structured outputs conditioned on textual or other modality inputs. The generative AI system 100 may train these models using score-based or denoising diffusion probabilistic methods across distributed server devices within the distributed server infrastructure 114.

The generative AI system 100 may also implement speech generation models, including text-to-speech (TTS) systems using autoregressive or non-autoregressive architectures, and audio diffusion models capable of generating high-fidelity waveforms conditioned on linguistic and prosodic features. Feature extraction components may preprocess audio data to create Mel-spectrograms or other representations used during model training using the pre-training components 104.

Specialty server devices within the generative AI system 100, such as those of the distributed server infrastructure 114, may include GPUs, TPUs, or custom AI accelerators designed for high-throughput operations supporting both transformer and diffusion model training. These servers may differ from ordinary servers by incorporating high-bandwidth memory (HBM), advanced interconnects (e.g., NVLink, PCIe Gen5), and thermal and power management systems optimized for large-scale generative model workloads.

The generative AI system 100 may store shard-specific checkpoints, intermediate latents, and optimizer states for large-scale diffusion models, LLMs, and multimodal models on high-speed local or network-attached storage within the specialty servers, enabling resumption of training and inference jobs after interruptions or updates.

The fine-tuning components 106 of the generative AI system 100 may adapt generative models to specific user tasks or domain tasks, such as personalized content generation, domain-specific summarization, image style transfer, or voice cloning. Fine-tuning may involve supervised fine-tuning on task-specific datasets and reinforcement learning with human feedback (RLHF) where applicable, with data and gradients distributed across server devices for scalable operation.

The interfacing layers 108 of the generative AI system 100 may handle user prompts for LLM-based text generation, text-to-image generation requests, and speech synthesis requests. The system may tokenize or encode user prompts, generate conditioning latents where applicable (e.g., CLIP embeddings for image generation), and distribute inference tasks across server clusters for each modality-specific generative model. The interfacing layers 108 may include computer scripts, subroutines, or integrated tools for processing prompts, implementing models, and/or performing API calls to supplement and/or augment generative functions of LLMs and other models of the generative AI system 100. In some embodiments, the interfacing layers 108 include databases for accessing stored content (e.g., a vector database of content vectors for comparing with prompt vectors or query vectors) for contextual augmentation of model operation (e.g., for retrieval-augmented generation and its analogs). In some embodiments, the interfacing layers 108 integrate functionality from third-party systems (e.g., external to the generative AI system 100 and/or the distributed server infrastructure 114) into the generative AI system 100 using APIs and/or particular communication protocols to interact with generative model data (e.g., to execute generated code).

As illustrated in FIG. 1, the generative AI system 100 generates generative output 110. The generative AI system 100 can generate the generative output 110 in the form of text responses, images, videos, audio clips, or other multimodal digital content. The generative AI system 100 can generate the generative output 110 using the interfacing layers 108 in conjunction with one or more trained (e.g., pre-trained and fine-tuned, using the described components) generative models, including LLMs and others described herein.

In some embodiments, the generative AI system 100 generates the generative output 110 over one or more conversational interactions or turns with client device(s) 112. Indeed, the generative AI system 100 can provide the generative output 110 for display on the client device(s) 112. In addition, the generative AI system 100 can receive additional input in the form of text-based queries or prompts, images, videos, audio clips, and/or other multimodal content as part of an ongoing conversation between the generative AI system 100 and the client device(s) 112 and/or as part of a new conversation or instantiation of the generative AI system 100.

For large generative models exceeding single-device memory, the generative AI system 100 may implement model parallelism, with different server devices processing partitions of the model during inference across the distributed server infrastructure 114 and may use activation checkpointing and memory recomputation strategies to handle resource constraints efficiently across distributed modalities.

Server devices within the generative AI system 100 may utilize high-bandwidth interconnects for low-latency tensor and latent exchange during multi-stage generation processes (e.g., latent generation followed by decoding in diffusion models). This enables the generative AI system 100 to support complex, multi-step generation tasks, such as generating text and subsequently generating images conditioned on the generated text, while maintaining low latency.

The distributed server infrastructure 114 of the generative AI system 100 may include compute clusters with racks of specialty servers interconnected with high-bandwidth networking technologies such as InfiniBand, RDMA-enabled Ethernet, or custom fabrics, and distributed storage using NVMe over Fabrics (NVMe-oF) for rapid access to large model weights, intermediate outputs, and context data during inference.

The distributed server infrastructure 114 can include safety filtering and content moderation layers that operate in parallel with inference pipelines across modalities, applying token-level filtering for LLM outputs, image or video classification for generated visual content, and audio analysis for speech outputs to ensure outputs comply with operational policies and applicable regulations.

The distributed server infrastructure 114 can include orchestration and resource management layers that dynamically allocate compute, memory, and network resources across modalities, scaling generative model training and inference in response to user demand and system load while monitoring resource health across components of the generative AI system 100.

Collectively, the architecture illustrated in FIG. 1 enables the generative AI system 100 to provide scalable, efficient, and safe generative model services across text, image, video, audio, and other modalities, leveraging specialty server devices and distributed computing for high-throughput training, fine-tuning, and inference across a wide variety of generative AI applications.

Figure 2:
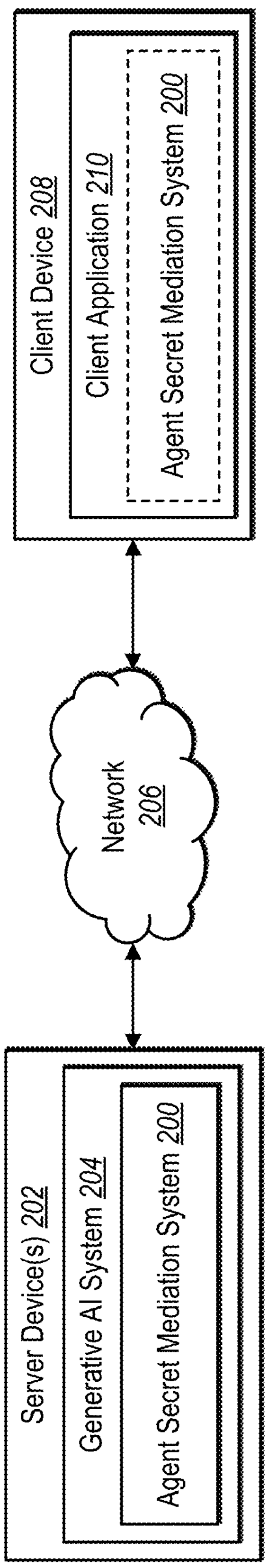
FIG. 2 illustrates a schematic diagram of an example environment of an agent secret mediation system in accordance with one or more embodiments.

As mentioned above, the generative AI system 100 can support an agent secret mediation system 200 that can enable a generative model agent to securely access external services by utilizing opaque placeholder credentials and a mediated secret injection process. FIG. 2 illustrates a schematic diagram of an example system environment for implementing an agent secret mediation system in accordance with one or more embodiments. An overview of the agent secret mediation system is described in relation to FIG. 2.

As shown, the environment includes server device(s) 202, a client device 208, and a network 206. Each of the components of the environment can communicate via the network 206, and the network 206 may be any suitable network over which computing devices can communicate. Example networks are discussed in more detail below in relation to FIGS. 10-11.

As mentioned above, the example environment includes a client device 208. The client device 208 can be one of a variety of computing devices, including a smartphone, a tablet, a smart television, a desktop computer, a laptop computer, a virtual reality device, an augmented reality device, or another computing device as described in relation to FIGS. 10-11. The client device 208 can communicate with the server device(s) 202 via the network 206. For example, the server device(s) 202 can receive input from the client device 208 (e.g., via the client application 210) to, for instance, interact with a generative AI system 204 located on the server device(s) 202. In addition, the agent secret mediation system 200 on the server device(s) 202 can receive information relating to various interactions with user interface elements based on the input received by the client device 208.

As shown, the client device 208 can include a client application 210. In particular, the client application 210 may be a web application, a native application installed on the client device 208 (e.g., a mobile application, a desktop application, etc.), or a cloud-based application where all or part of the functionality is performed by the server device(s) 202. Based on instructions from the client application 210, the client device 208 can present or display information, including a generative output based on a generative query from the client device 208.

As illustrated in FIG. 2, the example environment also includes the server device(s) 202. The server device(s) 202 may generate, track, store, process, receive, search, communicatively link, and transmit electronic data, such as user queries, model inputs, generative model agent requests, and external service outputs between client devices and the generative AI system 204, and/or other outputs generated by classification models within the system, and/or interactions between user accounts or client devices and the generative AI system 204. For example, the server device(s) 202 may receive data from the client device 208 in the form of a user prompt (e.g., content steering prompt) or query. Additionally, the server device(s) 202 can process inputs through the agent secret mediation system 200 and return generated outputs (e.g., text, code, images, audio, or video).

In some embodiments, the server device(s) 202 manage auxiliary tasks such as session tracking, context management, content filtering, and integration with databases or external tools. Indeed, the server device(s) 202 can communicate with the client device 208 to send and/or receive data via the network 206. In some implementations, the server device(s) 202 comprise(s) a distributed server where the server device(s) 202 include(s) a number of server devices distributed across the network 206 and located in different physical locations. The server device(s) 202 can comprise one or more content servers, application servers, communication servers, web-hosting servers, machine learning server, and other types of servers.

As shown in FIG. 2, the server device(s) 202 can also include the agent secret mediation system 200 as part of a generative AI system 204. The generative AI system 204 can communicate with the client device 208 to perform various functions associated with the client application 210 such as receiving text prompts or queries and generating outputs using the agent secret mediation system 200 or a generative model. The generative AI system 204 ingests structured or unstructured input data (e.g., text, images, audio recordings, digital video, etc.) and uses the large language model to intelligently produce outputs or mitigate generative prompts and digital content. The generative AI system 204 can further interface with backend infrastructure. In some examples, the generative AI system 204 interacts with a cloud storage module to access user-linked content items or generated digital content.

Although FIG. 2 depicts the agent secret mediation system 200 located on the server device(s) 202, in some implementations, the agent secret mediation system 200 may be implemented by (e.g., located entirely or in part on) one or more other components of the environment. For example, the agent secret mediation system 200 may be implemented by the client device 208 and/or a third-party device. For example, the client device 208 can download all or part of the agent secret mediation system 200 for implementation independent of, or together with, the server device (s) 202. In some embodiments, the agent secret mediation system 200 is implemented as a plug-in or modular extension associated with the generative AI system 204.

In some implementations, the environment may have a different arrangement of components and/or may have a different number or set of components altogether. For example, the client device 208 may communicate directly with the agent secret mediation system 200 bypassing the network 206. As another example, the environment can include a database located external to the server device(s) 202 (e.g., in communication via the network 206) or located on the server device(s) 202, on third-party servers, and/or on the client device 208.

As mentioned above, the generative AI system 100 can utilize an agent secret mediation system 200 to safely enable generative models to generate generative outputs based on sensitive data by injecting opaque placeholder credentials into a generative model environment and regenerating external service requests from the generative model environment to include sensitive credentials (or encryptions thereof). As used herein, the present disclosure introduces a variety of terms that describe features and functions of the agent secret mediation system 200. Additional detail is provided hereafter regarding the meaning of these terms as used in the disclosure.

As used herein, the term "generative model" refers to a machine learning model that is configured to generate new data samples that are statistically consistent with the data on which the model was trained. Generative models may include, but are not limited to, large language models, diffusion models, variational autoencoders, generative adversarial networks, and multimodal transformer models. Generative models may be configured to generate outputs across various modalities, including text, images, audio, and video, either independently or conditionally based on input data from the same or a different modality. For example, a generative model may generate an image based on a textual prompt, generate speech based on textual input, or generate text based on prior conversational context, and may operate using probabilistic or iterative denoising methods to produce high-quality, contextually appropriate outputs.

As used herein, the term "large language model" (or "LLM") refers to a computational model configured to process and generate human-readable text by learning statistical and contextual relationships within natural language data using machine learning techniques. An LLM typically comprises a deep neural network architecture, such as a transformer-based architecture with multiple layers and attention mechanisms, and is trained on large corpora of text using objectives such as masked language modeling, causal language modeling, or autoregressive prediction. The LLM may include billions or trillions of parameters and is capable of performing a variety of language tasks, including but not limited to text generation, summarization, translation, and question answering, by generating outputs based on input prompts in a contextually relevant manner.

Relatedly, the term "machine learning model" refers to a computational construct comprising one or more algorithms and associated parameters that are configured to perform tasks by identifying patterns or relationships within data. A machine learning model may be trained using supervised, unsupervised, semi-supervised, or reinforcement learning techniques, where the model parameters are adjusted based on input data to minimize a loss function or maximize a reward signal. The machine learning model may include, but is not limited to, neural networks (e.g., convolutional neural networks, recurrent neural networks, transformer models), decision trees, support vector machines, or ensemble models, and may be configured to perform tasks such as classification, regression, clustering, anomaly detection, or data generation. A machine learning model may operate on structured, unstructured, or multimodal data and may generate outputs that are used for predictions, decisions, or content generation based on learned representations of input data.

Additionally, the term "neural network" refers to a computational model comprising multiple interconnected processing elements, often referred to as neurons or nodes, that are organized into layers including an input layer, one or more hidden layers, and an output layer. Each neuron in the neural network applies a transformation, which may include a weighted sum of inputs followed by a non-linear activation function, to produce an output that is transmitted to subsequent neurons in the network. Neural networks are configured to learn representations of data by adjusting the weights and biases of the connections between neurons during a training process that minimizes a loss function. The neural network may include various architectures, including but not limited to feedforward neural networks, convolutional neural networks (CNNs), recurrent neural networks (RNNs), and transformer-based networks (e.g., LLMs), and may be utilized for tasks such as classification, regression, pattern recognition, natural language processing, and generative modeling across structured, unstructured, or multimodal data.

As used herein, the term "agent configuration data" or simply "configuration data" refers to data that defines operational parameters of a generative agent environment, including one or more sensitive credentials, designated domains or scope identifiers associated with the sensitive credentials, permitted operations or request constraints, placeholder grammar specifications, and policy rules. Agent configuration data may further indicate how a sensitive credential is to be applied within an outbound request (e.g., header insertion, query parameter inclusion, environment variable mapping, or cryptographic signing). In some cases, the agent secret mediation system 200 defines configuration data based on client device input within a particular graphical user interface.

Relatedly, as used herein, the term "sensitive credential" refers to confidential authentication material or authorization data that enables access to a protected resource or external service. A sensitive credential may include, for example, an API key, access token, OAuth token, signing key, private key, client certificate, shared secret, password, seed value for generating one-time codes, or another cryptographic or identity-bearing artifact. In certain embodiments, a secret store stores sensitive credentials to prevent generative model agents from accessing the sensitive credentials.

Additionally, as used herein, the term "opaque placeholder credential" refers to a non-sensitive token or identifier that represents a corresponding sensitive credential within a generative agent environment without revealing the underlying secret value. An opaque placeholder credential may encode, encrypt, wrap, or reference metadata such as a designated domain or request constraints associated with the sensitive credential.

Moreover, as used herein, the term "cryptographic credential" refers to an authorization artifact that the agent secret mediation system derives from a sensitive credential using a cryptographic operation and that an external service uses to authenticate or validate a request. A cryptographic credential may include, for example, a digital signature, a message authentication code (MAC), a hash-based signature (e.g., HMAC), a signed canonical request, an encrypted token, a time-based one-time password, or another derived value generated from the sensitive credential without transmitting the sensitive credential itself. In certain embodiments, an authorization translator generates cryptographic credentials from sensitive credentials.

As used herein, the term "authorization translator" refers to one or more computer code segments or subroutines (in combination with one or more models) which constitute a mediation service that operates outside a generative agent environment and intercepts outbound requests containing opaque placeholder credentials, retrieves corresponding sensitive credentials from a secret store, and conditionally injects either the sensitive credentials or cryptographic credentials into the outbound requests. An authorization translator may parse outbound requests to identify placeholder tokens, compare the requests to policy rules, perform transformations using the sensitive credentials (e.g., signing or token exchange), and forward modified requests to an external service. In certain embodiments, the authorization translator executes as a reverse proxy, sidecar, or intermediary service that prevents sensitive credentials from entering model-visible context.

Along these lines, as used herein, the term "policy engine" refers to one or more computer code segments or subroutines (in combination with one or more models) which constitute a rule-evaluation service that determines whether an authorization translator may inject or derive a credential for a given outbound request. The policy engine evaluates metadata associated with an opaque placeholder credential, metadata associated with a corresponding sensitive credential, and attributes of the outbound request, such as destination, method, path, headers, payload characteristics, identity context, or usage rate. Based on this evaluation, the policy engine may allow credential injection, deny the request, or require a transformation before the authorization translator forwards the outbound request to an external service.

In addition, as used herein, the term "generative agent environment input" or simply "agent environment input" refers to configuration data or other initialization information used to instantiate or modify a generative agent environment. For example, an agent environment input may include sensitive credentials, designated domains, tool definitions, execution constraints, or environment variables that define how a generative model agent interacts with external services.

As used herein, the term "placeholder value" refers to an opaque token or identifier that represents a sensitive credential without revealing the underlying secret. A placeholder value can encode or imply information such as an associated designated domain, a secret identifier, or one or more request constraints, while enabling a generative model agent to reference the sensitive credential without direct access to the sensitive credential.

Relatedly, as used herein, the term "designated domain" refers to an approved external (e.g., network) service destination scope to which a sensitive credential is permitted to be applied. A designated domain can correspond to, for example, a fully qualified domain name, service endpoint, host pattern, or service identifier that defines where outbound requests using the sensitive credential are authorized.

Additionally, as used herein, the term "request constraints" refers to one or more computer and/or network parameters defining usage limitations or policy conditions governing how a sensitive credential may be utilized when interacting with a designated domain. Request constraints can specify, for example, permitted HTTP methods, approved endpoint paths, required injection locations (e.g., header, environment variable, query parameter, or signing flow), required or prohibited request headers, or required or prohibited request body characteristics.

Figure 3:
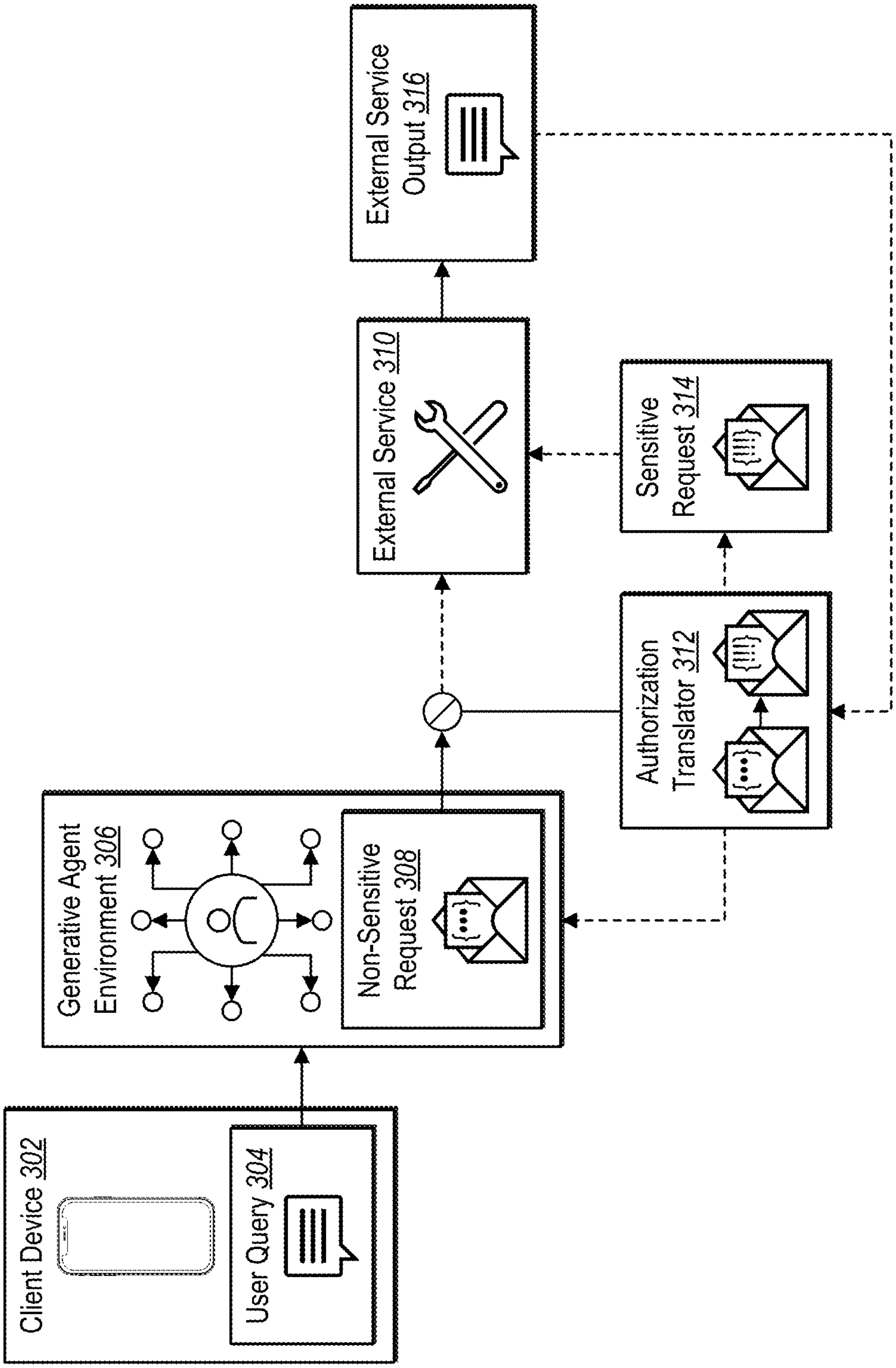
FIG. 3 illustrates an agent secret mediation system utilizing a generative agent environment to generate a non-sensitive request corresponding to a user query, intercepting the non-sensitive request, generating a sensitive request, providing the sensitive request to an external service in place of the non-sensitive request, and receiving an output from the external service in accordance with one or more embodiments.

FIG. 3 illustrates the agent secret mediation system 200 utilizing a generative agent environment to generate a non-sensitive request corresponding to a user query, intercepting the non-sensitive request, generating a sensitive request, providing the sensitive request to an external service in place of the non-sensitive request, and receiving an output from the external service in accordance with one or more embodiments. Additional detail regarding the acts and processes introduced in relation to FIG. 3 is provided thereafter with reference to subsequent figures.

As shown in FIG. 3, the agent secret mediation system 200 can receive a user query 304 from a client device 302 and provide the user query 304 to a generative agent environment 306. In response to receiving the user query 304, the generative agent environment 306 can generate a non-sensitive request 308 that includes one or more opaque placeholder credentials (substituted in place of sensitive credentials) and transmit the non-sensitive request 308 to an external service 310.

In certain implementations, the agent secret mediation system 200 uses an authorization translator 312 to intercept the non-sensitive request 308 before the non-sensitive request 308 reaches the external service 310. For example, the authorization translator 312 can intercept the non-sensitive request 308 on a just-in-time basis, such as at a network boundary immediately prior to transmission to the external service 310.

In one or more cases, the authorization translator 312 generates a sensitive request 314 by retrieving a sensitive credential corresponding to an opaque placeholder credential included in the non-sensitive request 308 and inserting the sensitive credential (or a cryptographic credential derived from the sensitive credential) into the request in accordance with one or more request constraints. Furthermore, the agent secret mediation system 200 can transmit the sensitive request 314 to the external service 310 in place of the non-sensitive request 308.

Additionally, the agent secret mediation system 200 can receive an external service output 316 from the external service 310 and provide the external service output 316 to the authorization translator 312 prior to exposing the external service output 316 to the generative agent environment 306 or the client device 302. In particular, the authorization translator 312 can inspect the external service output 316 to determine whether the external service output 316 contains a sensitive credential, derivative authentication material, or other restricted secret data. In response to detecting sensitive content, the authorization translator 312 can redact, mask, replace, or block the sensitive content before forwarding a non-sensitive output to the generative agent environment 306 and/or transmitting a resulting response to the client device 302.

In some embodiments, the agent secret mediation system 200 iteratively repeats the foregoing steps as part of an execution loop. For example, after receiving the external service output 316 from the authorization translator 312, the generative agent environment 306 can generate one or more additional non-sensitive requests based on the external service output 316 and transmit the one or more additional non-sensitive requests 308 to the external service 310. In response, the authorization translator 312 can intercept the one or more additional non-sensitive requests and inspect corresponding external service outputs in successive iterations until the generative agent environment 306 produces a final output for transmission to the client device 302.

As suggested by the foregoing discussion, the agent secret mediation system 200 can provide a variety of technical advantages relative to conventional systems for securely utilizing generative model agents in connection with sensitive credentials. For example, the agent secret mediation system 200 improves security by separating sensitive credentials from the runtime environment in which a generative model agent processes prompts, constructs tool arguments, and generates intermediate outputs. Specifically, instead of storing sensitive credentials within the same execution context that the generative model agent can inspect, transform, log, or otherwise propagate, the agent secret mediation system 200 can inject an opaque placeholder credential that indicates a secret identifier, a designated domain, and one or more request constraints while obfuscating the underlying sensitive credential. Moreover, the agent secret mediation system 200 can transmit outbound service requests toward an external service and use an authorization translator operating outside the generative model agent environment to intercept the outbound service requests before the outbound service requests reach the external service. In particular, the authorization translator can detect opaque placeholder credentials within such outbound service requests and insert sensitive credentials corresponding to the opaque placeholder credentials into the outbound service requests before allowing the outbound service request to reach the external service. Thus, the agent secret mediation system 200 reduces exposure of sensitive strings across execution layers and communication boundaries that commonly include logs, command histories, memory buffers, and other observable artifacts, thereby reducing the likelihood of malicious actors accessing and extracting those sensitive credentials.

Additionally, the agent secret mediation system 200 can operate more securely in the presence of adversarial or externally supplied instructions than conventional systems by constraining how a generative model agent can access and apply sensitive credentials within a generative agent environment. For example, while the generative model agent may synthesize contextual signals from system prompts, user inputs, retrieved content, and tool outputs to drive planning decisions, tool selection, and output generation, the agent secret mediation system 200 can maintain sensitive credentials outside the generative model agent's context and execution boundary.

To elaborate, instead of allowing injected instructions to cause the generative model agent to disclose or re-route a raw credential as part of its reasoning process, the agent secret mediation system 200 can require the generative model agent to operate on an opaque placeholder credential that lacks intrinsic secret value. Moreover, the agent secret mediation system 200 can enforce secret usage through an authorization translator and associated policy engine operating external to the generative model agent environment, such that injected prompts that attempt to manipulate tool usage or request destinations produce outputs that at most include the opaque placeholder credential rather than the sensitive credential. Thus, the agent secret mediation system 200 reduces vulnerability to prompt injection attacks that redirect tool usage or induce sensitive information misuse by enforcing request constraints outside the generative agent environment.

Furthermore, the agent secret mediation system 200 improves operational flexibility for authenticating external services relative to conventional systems by separating generic request construction performed by a generative model agent from service-specific credential application performed by an authorization translator operating outside the environment of the generative model agent. For example, because external services impose heterogeneous authentication schemes with protocol-specific semantics, the agent secret mediation system 200 can allow the generative model agent to construct outbound requests using opaque placeholder credentials in a consistent, service-agnostic manner, without embedding sensitive credentials in particular locations or formats during agent execution.

Moreover, instead of requiring the generative model agent to adapt its workflows to disparate authentication conventions, the agent secret mediation system 200 can use a dedicated policy engine operating outside the generative model agent environment to interpret a placeholder identifier specifying a target scope and an intended application method, and then instruct an authorization translator to inject the corresponding sensitive credential into the correct request location (e.g., header, query, environment mapping, or configuration). In addition, the agent secret mediation system 200 can perform service-specific transformations at the authorization translator, including signing steps such as HMAC-based signing or SigV4 signing and token exchanges, while maintaining underlying sensitive credentials outside the agent runtime. Thus, the agent secret mediation system 200 adapts more readily to heterogeneous authentication requirements across different external services by using a policy engine in tandem with an authorization translator to implement protocol-specific credentials while using a generative model agent to generate non-sensitive, placeholder-based requests.

Figure 4:
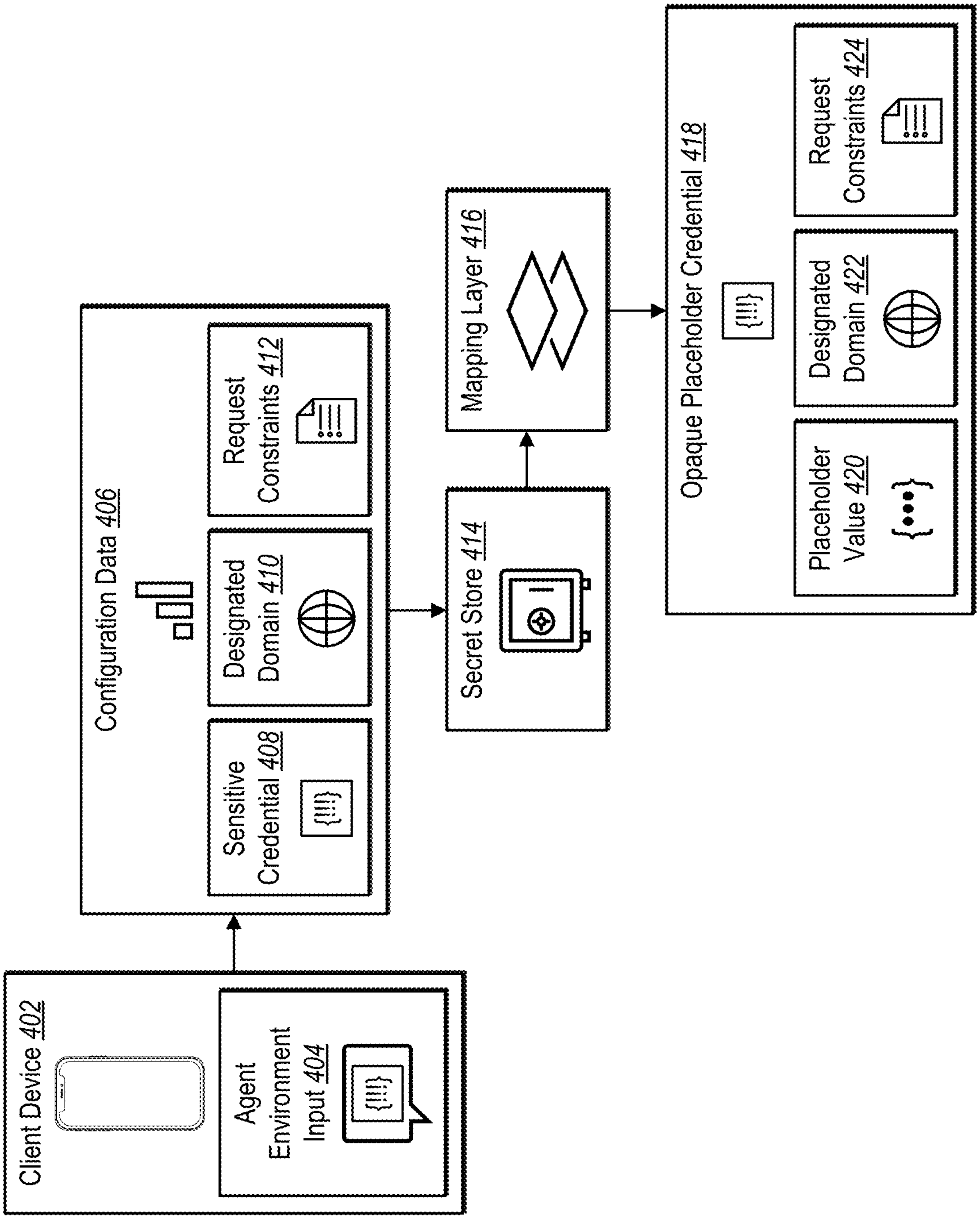
FIG. 4 illustrates an agent secret mediation system determining configuration data from an agent environment input, storing a sensitive credential from the configuration data in a secret store, and utilizing a mapping layer to generate an opaque placeholder credential corresponding to the sensitive credential in accordance with one or more embodiments.

Turning now to FIG. 4, the agent secret mediation system 200 can generate an opaque placeholder credential corresponding to configuration data determined from an agent environment input. FIG. 4 illustrates the agent secret mediation system 200 determining configuration data from an agent environment input, storing a sensitive credential from the configuration data in a secret store, and utilizing a mapping layer to generate an opaque placeholder credential corresponding to the sensitive credential in accordance with one or more embodiments.

As FIG. 4 illustrates, the agent secret mediation system 200 can receive an agent environment input 404 from a client device 402 to initialize or update a generative agent environment. In response to receiving the agent environment input 404, the agent secret mediation system 200 can derive configuration data 406 that specifies one or more operational parameters for external-service access, including a sensitive credential 408, a designated domain 410, and one or more request constraints 412 associated with use of the sensitive credential 408. In some cases, the agent secret mediation system 200 stores the sensitive credential 408 in a secret store 414 to maintain the sensitive credential 408 outside the generative agent environment and utilizes a mapping layer 416 to generate an opaque placeholder credential 418 corresponding to the configuration data 406. Specifically, the agent secret mediation system 200 can use the mapping layer 416 to generate a placeholder value 420 that obfuscates the sensitive credential 408 while indicating that the placeholder value 420 represents a sensitive credential, and to associate the placeholder value 420 with a designated domain 422 and request constraints 424 that govern how an authorization translator may later inject or derive the sensitive credential 408 for outbound requests targeting the designated domain 422.

To elaborate, the agent secret mediation system 200 can ingest the agent environment input 404 as a structured agent definition that includes tool settings, environment variables, and one or more secrets (e.g., sensitive credential 408). Based on the configuration data 406, the agent secret mediation system 200 can determine, for the sensitive credential 408, a corresponding secret identifier (e.g., a name assigned to the secret for internal tracking), a designated domain 410 representing an approved external service destination, and one or more request constraints 412 governing use of the sensitive credential 408. In one or more embodiments, the agent secret mediation system 200 infers the designated domain 410 automatically from the agent environment input 404. For example, the agent secret mediation system 200 can parse a tool definition, a base URL, a host pattern, a repository remote, or a network egress configuration included in the agent environment input 404 to determine the designated domain 410 and then store the designated domain 410 within the configuration data 406. Alternatively, the agent secret mediation system 200 can ingest the agent environment input 404 as an administrative policy update that binds a pre-existing secret identifier to an approved destination scope and associated usage parameters.

In some embodiments, the agent secret mediation system 200 provides different portions of the configuration data 406 to different runtime components based on sensitivity and operational need. In particular, the agent secret mediation system 200 can provide the placeholder value 420 and, in some cases, the designated domain 422 to a generative agent environment for use during request construction while providing the request constraints 424 to an authorization translator operating outside the generative agent environment for enforcement during request mediation. Thus, the generative agent environment can utilize the placeholder value 420 without receiving the request constraints 424, and the authorization translator can enforce the request constraints 424 without exposing the request constraints 424 to the generative model agent.

For example, a user account can provide a repository access token as the sensitive credential 408 and associate the repository access token with a source-control API endpoint designated by the designated domain 410, while limiting usage to read-only operations. The agent secret mediation system 200 can record the secret identifier, the approved destination, and the associated usage limitations and utilize that metadata to generate an opaque placeholder credential 418 that reflects the approved scope and constraints without exposing the sensitive credential 408.

In one or more embodiments, the mapping layer 416 determines a classification of the sensitive credential 408 and encodes the opaque placeholder credential 418 according to a format corresponding to the classification. In addition, the mapping layer 416 can determine that the classification is supported by an authorization translator operating outside the generative agent environment and generate the opaque placeholder credential 418 in response to determining that support. Moreover, the mapping layer 416 can determine and select (or suggest) a placeholder value 420, designated domain 422, and one or more request constraints 424 (e.g., header injection, environment variable substitution, or signing mode) associated with the classification.

For example, the mapping layer 416 can analyze structural characteristics and associated metadata of the sensitive credential 408 to determine a classification of the sensitive credential 408 as a bearer token class, an API key class, or a signing-key class, and can determine that the authorization translator supports the determined classification. In response to determining that the classification is supported, the mapping layer 416 can generate a placeholder value 420 formatted according to a placeholder grammar corresponding to the classification and associate the placeholder value 420 with a designated domain 422 derived from the configuration data 406 or a normalized service identifier. In addition, the agent secret mediation system 200 can determine one or more request constraints 424 associated with the classification (e.g., a header-injection mode with a predefined header name and prefix for a bearer token class, a query-parameter or environment-variable substitution mode for an API key class, or a signing mode specifying canonicalization and signature requirements for a signing-key class).

In some cases, the agent secret mediation system 200 determines how a generative model agent accesses secrets within the generative agent environment before generating the opaque placeholder credential 418. In particular, the mapping layer 416 can determine that the generative model agent accesses the sensitive credential 408 exclusively through environment variables, and in response, the mapping layer 416 can generate the placeholder value 420 as a simple identifier mapped to a corresponding environment variable name while maintaining metadata that binds the environment variable to the designated domain 422 and the request constraints 424.

In some cases, the mapping layer 416 generates (or encodes) the placeholder value 420 to indicate a storage location within the secret store 414 and/or a secret identifier corresponding to the sensitive credential 408. In certain instances, the agent secret mediation system 200 rotates, refreshes, or revokes sensitive credentials stored within the secret store 414 independently of the generative agent environment such that updates to the sensitive credential 408 do not require modification of the placeholder value 420 referenced by the generative model agent. By way of example, if a user account configures a Git hosting token as the sensitive credential 408 for a code agent, the agent secret mediation system 200 can store the Git hosting token in the secret store 414 under a secret identifier and classify the Git hosting token as a header-injection credential. The mapping layer 416 can then generate an opaque placeholder credential 418 comprising a placeholder value 420 that signals "header usage" and bind the placeholder value 420 to a designated domain 422 corresponding to a Git service API hostname. If the Git hosting token is later rotated or refreshed within the secret store 414, the generative model agent can continue referencing the same placeholder value 420 without modification.

For example, when a build tool inside the generative agent environment is configured to read a repository token from an environment variable "export GITHUB_TOKEN=abcd1234," the agent secret mediation system 200 can replace "abcd1234" with a placeholder value 420 associated with "GITHUB_TOKEN", bind "GITHUB_TOKEN" to a designated domain 422 such as api.github.com, and restrict permitted operations to read-only repository requests reflected in the request constraints 424. The generative model agent can continue to reference GITHUB_TOKEN, but the sensitive credential 408 remains stored in the secret store 414 and outside the generative agent environment.

Moreover, the mapping layer 416 can determine that the generative model agent embeds credentials directly into request structures (e.g., headers, query parameters, or signing flows), and in response, the mapping layer 416 can generate the placeholder value 420 as a structured token that encodes or implies a scope identifier and a usage directive, and associate the structured token with explicit injection and policy metadata. For instance, when configuration data 406 specifies that requests to "api.paymentprovider.com" require an authorization header with a predefined prefix, the mapping layer 416 can generate a structured placeholder value 420 such as "SECRET[api.paymentprovider.com.header]" and associate the placeholder value 420 with metadata identifying the header name (e.g., "Authorization"), required prefix format (e.g., "Bearer"), and permitted HTTP methods (e.g., "GET").

In one or more embodiments, the mapping layer 416 generates the designated domain 422 based on the designated domain 410 specified in the configuration data 406. For example, when the configuration data 406 specifies a service identifier or host pattern, the mapping layer 416 can resolve the service identifier or host pattern into a concrete hostname or endpoint representation used by an authorization translator when processing outbound requests that reference the placeholder value 420.

In some cases, the mapping layer 416 generates the request constraints 424 by translating parameters associated with the sensitive credential 408 into metadata bound to the placeholder value 420. For instance, if the configuration data 406 includes an indication that only read operations are permitted for a particular service, the mapping layer 416 can derive corresponding method-level and endpoint-level constraints and encode those constraints within the request constraints 424 associated with the designated domain 422.

In one or more embodiments, the agent secret mediation system 200 configures the request constraints 424 to specify fine-grained constraints for requests directed to the designated domain 410 or the designated domain 422 using the sensitive credential 408. In particular, the agent secret mediation system 200 can encode permitted request headers, prohibited request headers, required body content, or prohibited body content as part of the request constraints 412 and propagate those constraints into the request constraints 424 associated with the opaque placeholder credential 418. For instance, the agent secret mediation system 200 can define, within the request constraints 424, that only a "User-Agent" header and a designated authorization header are permitted while prohibiting forwarding of unrelated credential-bearing headers. Indeed, the agent secret mediation system 200 can further define that a request body of the outbound request directed to the designated domain 422 must conform to an expected schema for an approved endpoint class, such that an authorization translator enforces the encoded request constraints 424 when processing outbound requests that reference the opaque placeholder credential 418.

Further, the mapping layer 416 can generate service-specific injection requirements as metadata. In particular, the mapping layer 416 can store, as part of the request constraints 424, metadata indicating instructions on how to utilize the sensitive credential 408 (e.g., an injection location (header, query parameter, configuration file, signing flow), a header name, a prefix string, or transformation semantics). For example, the mapping layer 416 can associate a placeholder value 420 for a repository API with metadata indicating an "Authorization" header requirement and a "Bearer" prefix requirement.

Additionally, in response to determining that a generative model agent operating within the generative agent environment does not embed sensitive credentials directly into outbound requests, the agent secret mediation system 200 can generate an opaque placeholder credential that obfuscates the sensitive credential 408 without indicating any designated domain. For example, when the generative model agent passes a secret reference to a local tool interface that independently determines destination selection and performs network communication outside of the generative model agent's request construction logic, the agent secret mediation system 200 can generate a domain-agnostic placeholder value that conceals the sensitive credential 408.

In some cases, the agent secret mediation system 200 stores the opaque placeholder credential 418 within a configuration artifact used by the generative agent environment, such as a configuration file or an environment mapping file. For example, the agent secret mediation system 200 can replace a sensitive credential within a tool configuration file or environment-variable mapping with the placeholder value 420 such that the generative model agent reads and propagates the placeholder value 420 during execution while the sensitive credential 408 remains stored in the secret store 414.

Figure 5:
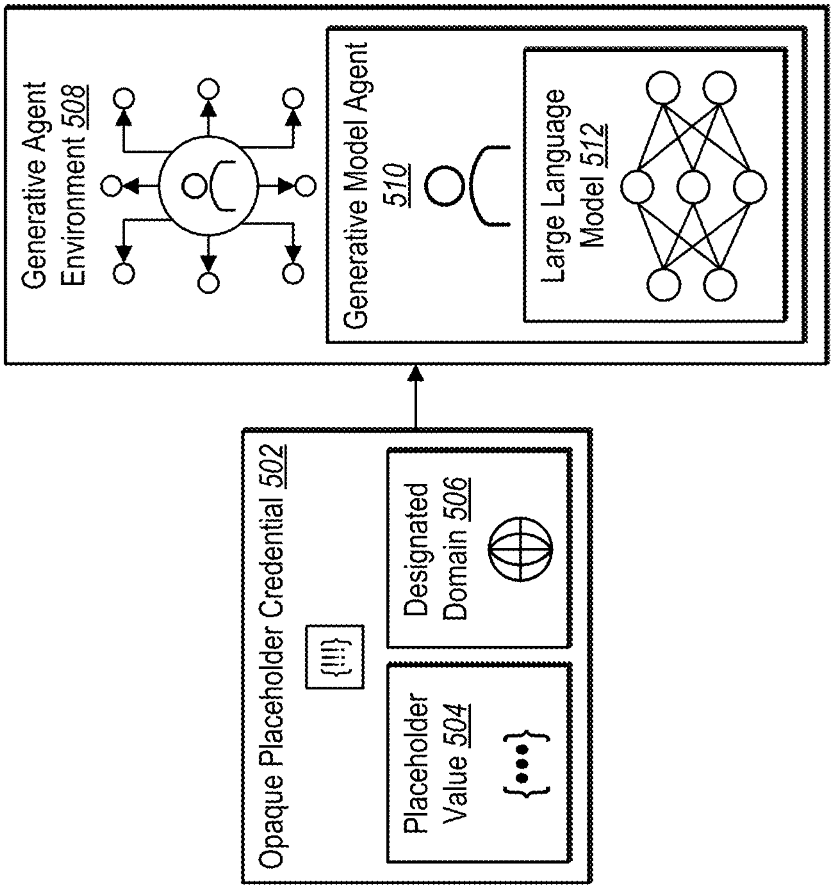
FIG. 5 illustrates an agent secret mediation system injecting an opaque placeholder credential into a generative agent environment in accordance with one or more embodiments.

As mentioned briefly above, the agent secret mediation system 200 can provide an opaque placeholder credential to a generative agent environment for use in place of a sensitive credential. FIG. 5 illustrates the agent secret mediation system 200 injecting an opaque placeholder credential into a generative agent environment in accordance with one or more embodiments.

As shown in FIG. 5, the agent secret mediation system 200 can inject an opaque placeholder credential 502 into a generative agent environment 508 for use by a generative model agent 510 operating within the generative agent environment 508. In particular, the opaque placeholder credential 502 can comprise a placeholder value 504 bound to a designated domain 506 and, in some cases, one or more request constraints that define how a corresponding sensitive credential may be used by external services. The generative model agent 510 can utilize a large language model 512 that generates tool calls, API requests, or other structured outputs referencing the placeholder value 504.

In some cases, the agent secret mediation system 200 only provides the placeholder value 504 and the designated domain 506 to the generative agent environment 508 and provides request constraints associated with the opaque placeholder credential 502 to an authorization translator operating outside the generative agent environment 508.

To elaborate, the agent secret mediation system 200 can inject the opaque placeholder credential 502 directly into the generative agent environment 508 by placing the placeholder value 504 into configuration fields, environment variables, or tool parameter definitions that are accessible to the generative model agent 510 at runtime. In particular, the agent secret mediation system 200 can provision the generative agent environment 508 such that any location where a sensitive credential would ordinarily appear instead contains the placeholder value 504 bound to the designated domain 506. In some cases, a mapping layer generates the placeholder value 504 to encode the designated domain 506 within a placeholder grammar such that the designated domain 506 travels with the placeholder value 504 through request construction. The generative agent environment 508 therefore initializes with the placeholder value 504 while the corresponding sensitive credential remains external to the generative agent environment 508.

In one or more implementations, the generative model agent 510 and the large language model 512 treat the placeholder value 504 as the exclusive in-environment representation of a sensitive credential. In certain instances, the generative model agent 510 and the large language model 512 treat the placeholder value 504 as a secret value available within the generative agent environment 508 and generate commands, tool calls, or network requests using the placeholder value 504 without identifying the placeholder value 504 as a placeholder token. Further, the agent secret mediation system 200 can configure the generative agent environment 508 such that the generative model agent 510 does not locally resolve the placeholder value 504 into a sensitive credential and instead carries the placeholder value 504 through request construction.

Furthermore, the designated domain 506 associated with the opaque placeholder credential 502 can guide how the generative model agent 510 and the large language model 512 form destination-specific outputs. For example, when the generative model agent 510 prepares a tool call that targets a particular service hostname, the generative model agent 510 can reference the designated domain 506 as the approved destination scope associated with the placeholder value 504.

In certain instances, the agent secret mediation system 200 utilizes request constraints associated with the opaque placeholder credential 502 to shape how the generative model agent 510 and the large language model 512 place and format the placeholder value 504 within requests to external services. For instance, when request constraints associated with the opaque placeholder credential 502 specify that a storage service expects the sensitive credential as a query parameter named "api_key" and permits its use only in "GET" requests to an approved resource path, the large language model 512 can generate a request (e.g., "GET/v2/files?api_key=SECRET[fileservice.query]"), placing the placeholder value 504 in the required query parameter instead of in an HTTP header or request body.

Figure 6:
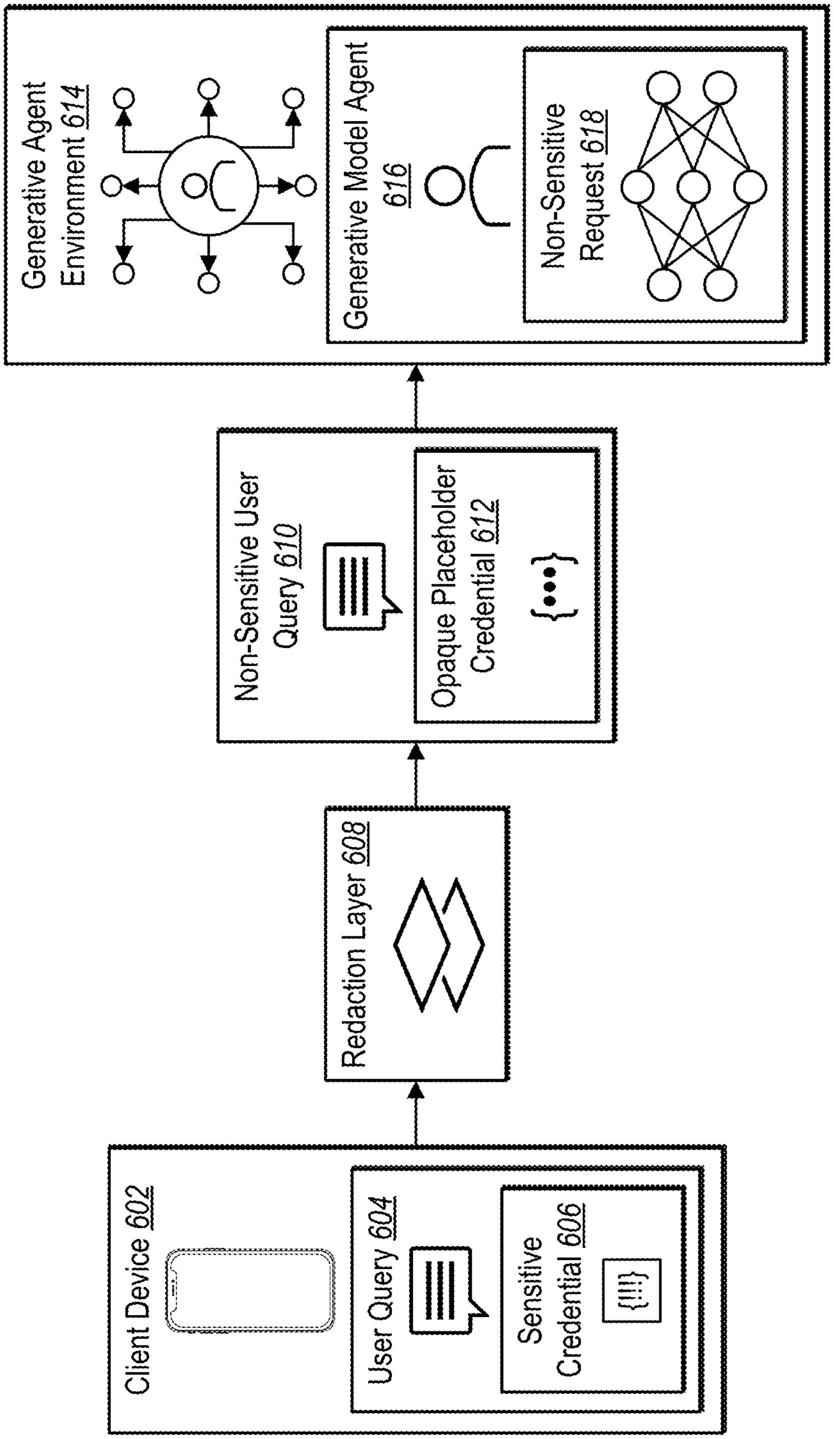
FIG. 6 illustrates an agent secret mediation system utilizing a redaction layer to generate a non-sensitive user query and providing the non-sensitive user query to a generative agent environment in accordance with one or more embodiments.

In one or more embodiments, the agent secret mediation system 200 censors user queries provided to the generative agent environment to prevent the generative agent environment from accessing sensitive credentials. FIG. 6 illustrates the agent secret mediation system 200 utilizing a redaction layer to generate a non-sensitive user query and providing the non-sensitive user query to a generative agent environment in accordance with one or more embodiments.

As illustrated in FIG. 6, the agent secret mediation system 200 can receive a user query 604 from a client device 602, where the user query 604 includes a sensitive credential 606 or other sensitive material. Furthermore, the agent secret mediation system 200 can utilize a redaction layer 608 to identify the sensitive credential 606 within the user query 604 and generate a non-sensitive user query 610 that replaces the sensitive credential 606 with an opaque placeholder credential 612. In addition, the agent secret mediation system 200 can provide the non-sensitive user query 610 to a generative model agent 616 operating within a generative agent environment 614 such that the generative model agent 616 operates on the opaque placeholder credential 612 instead of the sensitive credential 606. Upon receiving the non-sensitive user query 610, the generative model agent 616 can generate a non-sensitive request 618 that references the opaque placeholder credential 612 while omitting the sensitive credential 606.

To elaborate, the agent secret mediation system 200 can utilize the redaction layer 608 to analyze the user query 604 prior to model ingestion and identify the sensitive credential 606 using pattern-based detection. In some cases, the redaction layer 608 evaluates multiple representations of candidate sensitive credentials in parallel, such as by scanning for known credential formats while also decoding suspected encodings and rescanning decoded text. For instance, if the user query 604 includes a base64-encoded string that decodes to an API key format, the redaction layer 608 can detect the decoded sensitive credential 606 and censor the underlying secret material before generating the non-sensitive user query 610.

In one or more embodiments, the agent secret mediation system 200 recognizes and redacts secret material independent of whether a user account has explicitly input the secret material into the agent secret mediation system 200. In particular, the redaction layer 608 can identify candidate secrets based on structural features, contextual cues, and statistical characteristics, including tokens that do not match a predefined credential format associated with a registered secret store entry. For example, the redaction layer 608 can detect and redact a previously unseen session token, a transient access key, a one-time password, a private-key fragment, or a personal identifier embedded in the user query 604 or other model-visible content even when the agent secret mediation system 200 has not previously stored the secret material in a secret store. In response to detecting such unregistered secret material, the redaction layer 608 can replace the detected substring with a generic opaque placeholder credential, mask or truncate the detected substring, and/or block transmission of the detected substring to the generative agent environment 614.

In addition, the agent secret mediation system 200 can generate the non-sensitive user query 610 by replacing the sensitive credential 606 with the opaque placeholder credential 612 in-line within the user query 604. In one or more embodiments, the agent secret mediation system 200 stores the sensitive credential 606 in a secret store and generates an opaque placeholder credential 612 that is linked to the stored sensitive credential 606. The agent secret mediation system 200 can then substitute the opaque placeholder credential 612 into the content provided to the generative agent environment 614 so that the generative model agent 616 operates exclusively on the opaque placeholder credential 612. For example, if the user query 604 includes a command such as a curl invocation containing a database password or API key embedded as a parameter value, the agent secret mediation system 200 can store the detected sensitive credential 606 in the secret store and generate an opaque placeholder credential 612 linked to the stored sensitive credential 606. The agent secret mediation system 200 can then replace only the credential substring in the command with the opaque placeholder credential 612 while preserving the remaining command structure.

Additionally, upon receiving the non-sensitive user query 610, the generative model agent 616 can generate a non-sensitive request 618 that carries the opaque placeholder credential 612 forward as a credential reference while omitting the sensitive credential 606. In particular, the generative model agent 616 can position the opaque placeholder credential 612 within a tool call, a request template, or a command argument in the position where the corresponding sensitive credential would have been located. In some cases, the agent secret mediation system 200 configures the generative agent environment 614 to treat the opaque placeholder credential 612 as the only credential-like artifact available to the generative model agent 616, thereby avoiding exposure of sensitive credentials through common runtime leakage surfaces such as prompt logs, shell history, or intermediate files.

In some cases, the agent secret mediation system 200 applies the same redaction layer 608 to additional inputs destined for model-visible context beyond live prompts, such as training datasets, fine-tuning corpora, or evaluation inputs. For example, prior to ingesting a corpus containing developer artifacts, the agent secret mediation system 200 can scan the corpus for raw or encoded sensitive credentials, replace detected sensitive credentials with corresponding opaque placeholders, and prevent sensitive credentials from entering the generative agent environment 614 through training-time ingestion.

Moreover, when the agent secret mediation system 200 cannot reliably identify a class of sensitive material due to inconsistent syntax, the agent secret mediation system 200 can prompt a user account to register the sensitive credential. For example, when a developer intends to use a database password that does not match any known credential pattern, the agent secret mediation system 200 can receive the database password via a configuration interface and associate the database password with an approved destination scope and usage parameters specified by the user account. The agent secret mediation system 200 can then generate an opaque placeholder credential 612 corresponding to the database password and provide the opaque placeholder credential 612 for mediated use by the generative agent environment 614.

Figure 7:
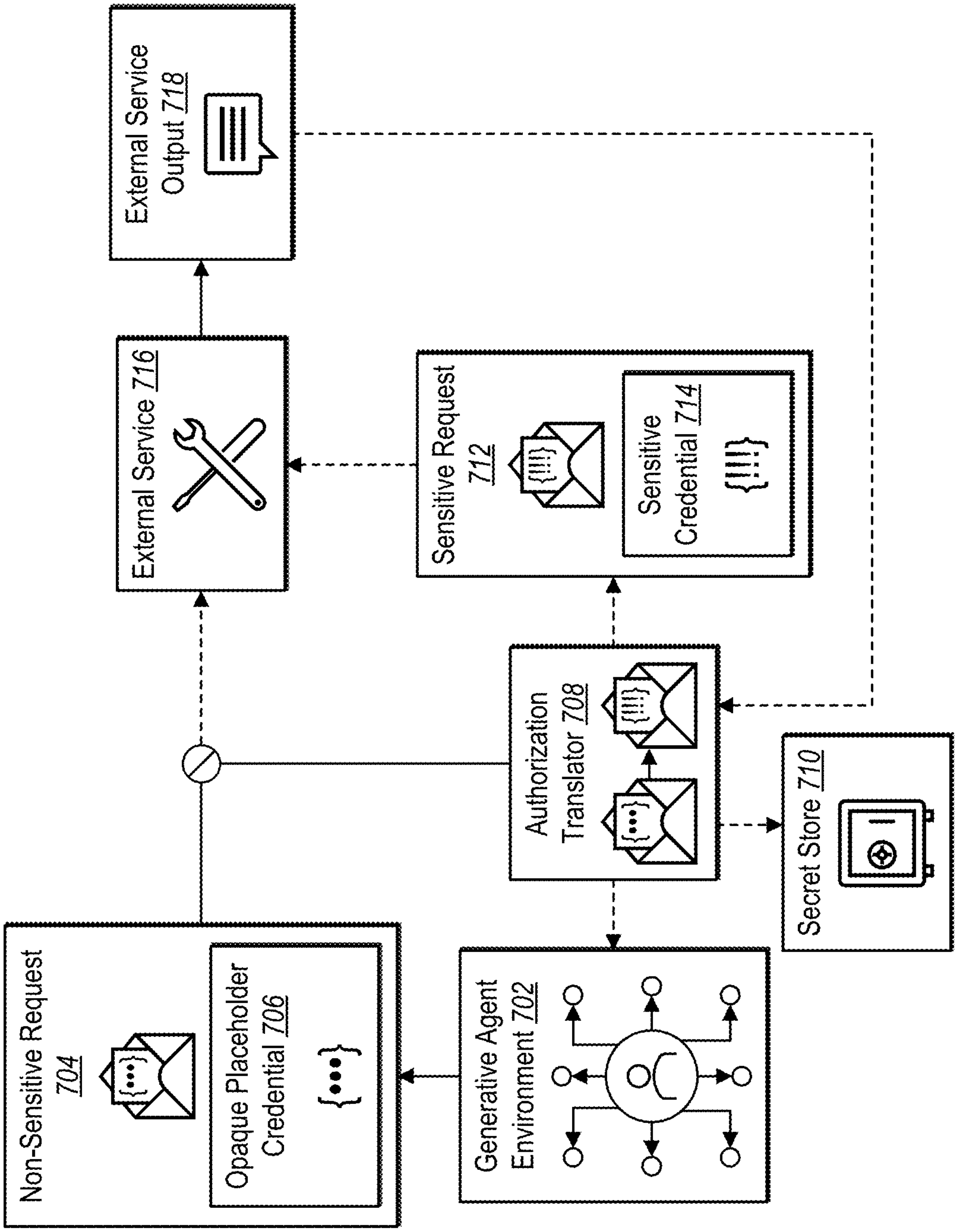
FIG. 7 illustrates an agent secret mediation system using an authorization translator to intercept a non-sensitive request and generate a sensitive request to provide to an external service in accordance with one or more embodiments.

As mentioned briefly above, the agent secret mediation system 200 can intercept a non-sensitive request generated by a generative model agent and modify the non-sensitive request using an authorization translator. FIG. 7 illustrates the agent secret mediation system 200 using an authorization translator to intercept a non-sensitive request and providing a sensitive request to an external service in accordance with one or more embodiments.

As shown in FIG. 7, the agent secret mediation system 200 can utilize an authorization translator 708 to intercept a non-sensitive request 704 transmitted from a generative model agent toward an external service 716. Moreover, the agent secret mediation system 200 can utilize a policy engine to compare the non-sensitive request 704 to a designated domain and one or more request constraints associated with the opaque placeholder credential 706 and determine whether to extract the sensitive credential 714 from the secret store 710 to generate and forward a sensitive request 712 to the external service 716 in place of the non-sensitive request 704. In some cases, after the authorization translator 708 transmits the sensitive request 712, the agent secret mediation system 200 can receive an external service output 718 from the external service 716 and provide the external service output 718 to the authorization translator 708. In response, the authorization translator 708 can verify that the external service output 718 does not contain the sensitive credential 714 before providing the external service output 718 to the generative agent environment 702.

In one or more embodiments, the agent secret mediation system 200 utilizes the authorization translator 708 as an outbound proxy, reverse proxy, and/or sidecar component between a generative agent environment that generated the non-sensitive request 704 and the external service 716. In particular, the agent secret mediation system 200 can route outbound traffic from the generative agent environment through the authorization translator 708 such that the authorization translator 708 intercepts the non-sensitive request 704 before the non-sensitive request 704 reaches the external service 716. Additionally, the agent secret mediation system 200 can configure the authorization translator 708 to intercept the non-sensitive request 704 immediately before the non-sensitive request 704 reaches the external service 716 to reduce exposure of a sensitive credential 714 corresponding to the opaque placeholder credential 706.

Upon intercepting the non-sensitive request 704, the agent secret mediation system 200 can use the authorization translator 708 to parse bytes of the non-sensitive request 704 and locate the opaque placeholder credential 706. For instance, if the non-sensitive request 704 includes a header such as "Authorization: Bearer SECRET[payments.api-.header]," the authorization translator 708 can detect the opaque placeholder credential 706 "SECRET[payments.api-.header]" within the header and provide the non-sensitive request 704 (and/or metadata generated from the non-sensitive request 704) to the policy engine.

In certain instances, the agent secret mediation system 200 utilizes the authorization translator 708 to generate metadata from the non-sensitive request 704. In particular, the authorization translator 708 can extract metadata indicating a destination host, request method, request path, and/or header information from the non-sensitive request 704 and associate the extracted metadata with metadata derived from the opaque placeholder credential 706. For example, if the non-sensitive request 704 targets "api.payments.example.com" using an HTTP POST method to a "/v1/charges" endpoint and includes the opaque placeholder credential 706 in an authorization header, the authorization translator 708 can correlate the host, method, and endpoint path of the non-sensitive request 704 with (i) a designated domain indicated by (or associated with) the opaque placeholder credential 706 and (ii) permitted-operation metadata associated with the opaque placeholder credential 706.

In addition, the agent secret mediation system 200 can provide the generated metadata to a policy engine to decide whether to deny, allow, and/or transform the non-sensitive request 704. In particular, the policy engine can base the decision on one or more request constraints previously stored by the authorization translator 708 in association with the opaque placeholder credential 706. The authorization translator 708 can store the one or more request constraints in response to receiving the one or more request constraints from a mapping layer that generates the opaque placeholder credential 706 and binds the one or more request constraints to the opaque placeholder credential 706 for later enforcement. In some implementations, the policy engine evaluates whether the external service 716 corresponds to the designated domain of the opaque placeholder credential 706 and verifies that the non-sensitive request 704 satisfies request constraints indicated by the authorization translator 708. For instance, if the authorization translator 708 indicates that the sensitive credential 714 is configured for read-only access to "api.payments.example.com," the policy engine can direct the authorization translator 708 to deny a non-sensitive "POST/v1/charges" request but to allow a non-sensitive "GET/v1/transactions" request.

In some examples, the agent secret mediation system 200 configures the policy engine with allow-list and deny-list controls that govern mediation outcomes for outbound requests referencing the opaque placeholder credential 706. In particular, the policy engine can maintain an allow list specifying permitted destination scopes, request methods, and/or endpoint patterns for a given secret identifier and can maintain a deny list specifying prohibited destinations, prohibited request characteristics, and/or disallowed secret-usage scenarios. Additionally, the authorization translator 708 can support multiple secret-store backends by maintaining a list of supported secret stores (e.g., secret store 710), including user password managers, enterprise vault services, or other credential repositories, and retrieving the sensitive credential 714 from a selected secret store based on secret metadata bound to the opaque placeholder credential 706. Further, in one or more implementations, the authorization translator 708 supports a plugin architecture for compatibility with external systems, including plugins that implement service-specific signing, token exchange, request-format adaptation, or secret-store integration such that the authorization translator 708 can mediate heterogeneous credential types and external-service protocols using a common interception workflow.

In one or more embodiments, the agent secret mediation system 200 utilizes the authorization translator 708 to retrieve a sensitive credential 714 corresponding to the opaque placeholder credential 706 based on receiving a policy decision from the policy engine indicating that the non-sensitive request 704 is allowable. In particular, the authorization translator 708 can retrieve the sensitive credential 714 from a secret store 710 that is inaccessible to the generative model agent. The authorization translator 708 can then regenerate the non-sensitive request 704 to form the sensitive request 712 by replacing the opaque placeholder credential 706 with the sensitive credential 714 or by inserting authentication material derived from the sensitive credential 714 into a location of the opaque placeholder credential 706 indicated by the opaque placeholder credential 706.

To elaborate, if request constraints associated with the opaque placeholder credential 706 specify that the external service 716 accepts an API key in a query parameter, the authorization translator 708 can replace the opaque placeholder credential 706 with the sensitive credential 714 in the approved query parameter and forward the sensitive request 712 to the external service 716. Alternatively, the authorization translator 708 can generate an authentication token corresponding to the sensitive credential 714 (e.g., an OAuth access token, a session token, or another derived token) and provide the authentication token for use in calling the external service 716 in place of the opaque placeholder credential 706.

Alternatively, the agent secret mediation system 200 can generate a cryptographic credential from the sensitive credential 714 and generate the sensitive request 712 by inserting the cryptographic credential into the non-sensitive request 704. In particular, the authorization translator 708 can apply a symmetric or asymmetric encryption operation, generate a message authentication code, mint a signed token, and/or generate a request signature derived from the sensitive credential 714 in accordance with protocol requirements of the external service 716. The authorization translator 708 can then regenerate the non-sensitive request 704 as the sensitive request 712 by replacing the opaque placeholder credential 706 with the cryptographic credential and providing the cryptographic request to the external service 716. For example, if the external service 716 requires that authentication material be transmitted in encrypted form, the authorization translator 708 can encrypt the sensitive credential 714 using a public key associated with the external service 716 to generate ciphertext and insert the ciphertext into an approved header or request field in place of the opaque placeholder credential 706 to generate the sensitive request 712, such that the external service 716 can decrypt the ciphertext using a corresponding private key.

Additionally, in response to receiving a policy decision from the policy engine that requires a transformation, the agent secret mediation system 200 can utilize the authorization translator 708 to generate authentication material derived from the sensitive credential 714 and regenerate the non-sensitive request 704 to carry the resulting authentication material in place of the opaque placeholder credential 706. In particular, the authorization translator 708 can perform a token exchange, execute an OAuth flow, mint an ephemeral credential derived from the sensitive credential 714, and/or generate request-signing material and then forward the regenerated sensitive request 712 to the external service 716. For instance, if the sensitive credential 714 comprises a permanent refresh token associated with a user account, the authorization translator 708 can execute an OAuth token-exchange flow with an authorization server to obtain an ephemeral access token scoped to a designated domain and request constraints, insert the ephemeral access token into an authorization header in place of the opaque placeholder credential 706, and forward the regenerated sensitive request 712 to the external service 716.

In some cases, the agent secret mediation system 200 handles multiple opaque placeholder credentials within a single non-sensitive request 704 (or across multiple requests) by comparing each opaque placeholder credential to corresponding designated-domain and request-constraint metadata and regenerating the non-sensitive request 704 only for the opaque placeholder credentials that satisfy the policy decision from the policy engine.

In certain implementations, if the policy engine denies the non-sensitive request 704, the agent secret mediation system 200 can utilize the authorization translator 708 to prevent the non-sensitive request 704 from reaching the external service 716 and return an error response to the generative agent environment that generated the non-sensitive request 704.

For example, the authorization translator 708 can return an error that indicates a violated constraint (e.g., destination mismatch, method violation, path violation, prohibited header, or disallowed body content) without revealing the sensitive credential 714.

Moreover, the agent secret mediation system 200 can log decisions made by the policy engine, actions taken by the authorization translator 708, and metadata associated with the non-sensitive request 704 and/or the sensitive request 712. In particular, the agent secret mediation system 200 can log a secret identifier corresponding to the opaque placeholder credential 706, a designated domain, a request method, a request path, and a timestamp associated with the non-sensitive request 704, as well as an indication of whether the policy engine allowed, denied, and/or transformed the non-sensitive request 704, while refraining from logging the sensitive credential 714. In one or more embodiments, the agent secret mediation system 200 can also log tool-context indicators (e.g., an identity of a calling tool or agent-runtime component) associated with the non-sensitive request 704.

In addition, if the non-sensitive request 704 uses a binary protocol or a compressed payload, the authorization translator 708 can apply safe parsing and decompression rules prior to placeholder detection, or the authorization translator 708 can deny substitution when the authorization translator 708 cannot validate placeholder presence and request-constraint compliance reliably. Further, for upgraded connections (e.g., WebSockets), the authorization translator 708 can enforce placeholder substitution and request-constraint validation during a handshake phase.

In one or more implementations, after forwarding the sensitive request 712 to the external service 716, the agent secret mediation system 200 receives the external service output 718 and routes the external service output 718 back to the generative agent environment that generated the non-sensitive request 704. Indeed, the agent secret mediation system 200 can analyze the external service output 718 to verify that the external service output 718 does not contain the sensitive credential 714 (or other protected secret material) before providing the external service output 718 to the generative agent environment.

In certain instances, the agent secret mediation system 200 detects that a classification of the sensitive credential 714 is not supported by the authorization translator 708. In response, the agent secret mediation system 200 can temporarily inject the sensitive credential 714 into the generative agent environment with additional runtime monitoring, detect an outbound request from the generative agent environment that includes the temporarily injected sensitive credential 714, and configure the authorization translator 708 (based on the detected outbound request) to support the classification going forward. For example, when a legacy command-line tool requires a private key in a nonstandard location, the agent secret mediation system 200 can monitor outbound communications while the legacy tool executes, learn the injection location and protocol semantics that the legacy tool uses, and then update the authorization translator 708 to perform subsequent authentications using derived cryptographic credentials without exposing the private key to the generative agent environment.

Figure 8A:
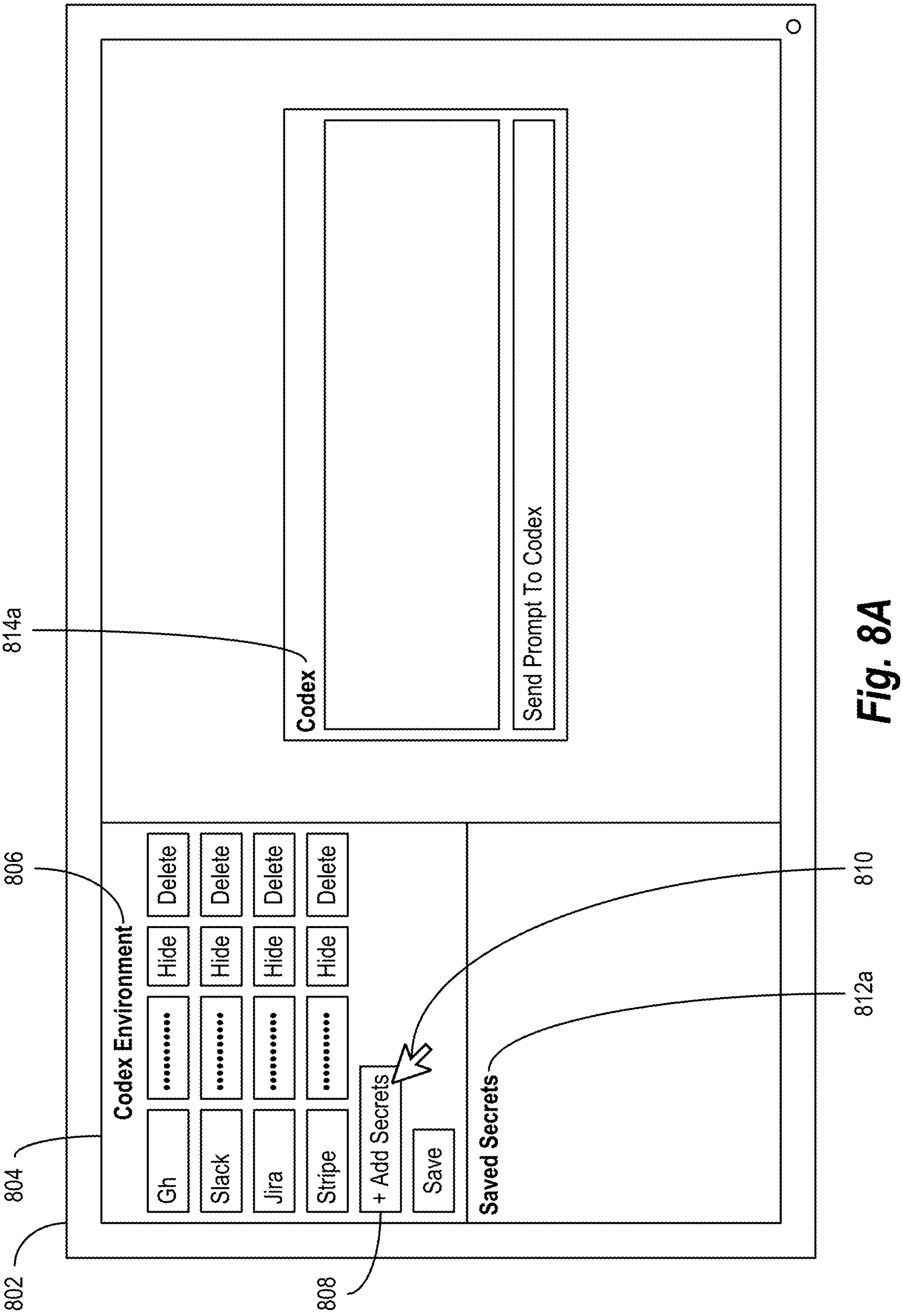
FIGS. 8A-8C illustrate graphical user interfaces for inputting sensitive credentials into a generative agent environment, designating domains associated with the sensitive credentials, and displaying an output generated using the sensitive credential in accordance with one or more embodiments.
Figure 8B:
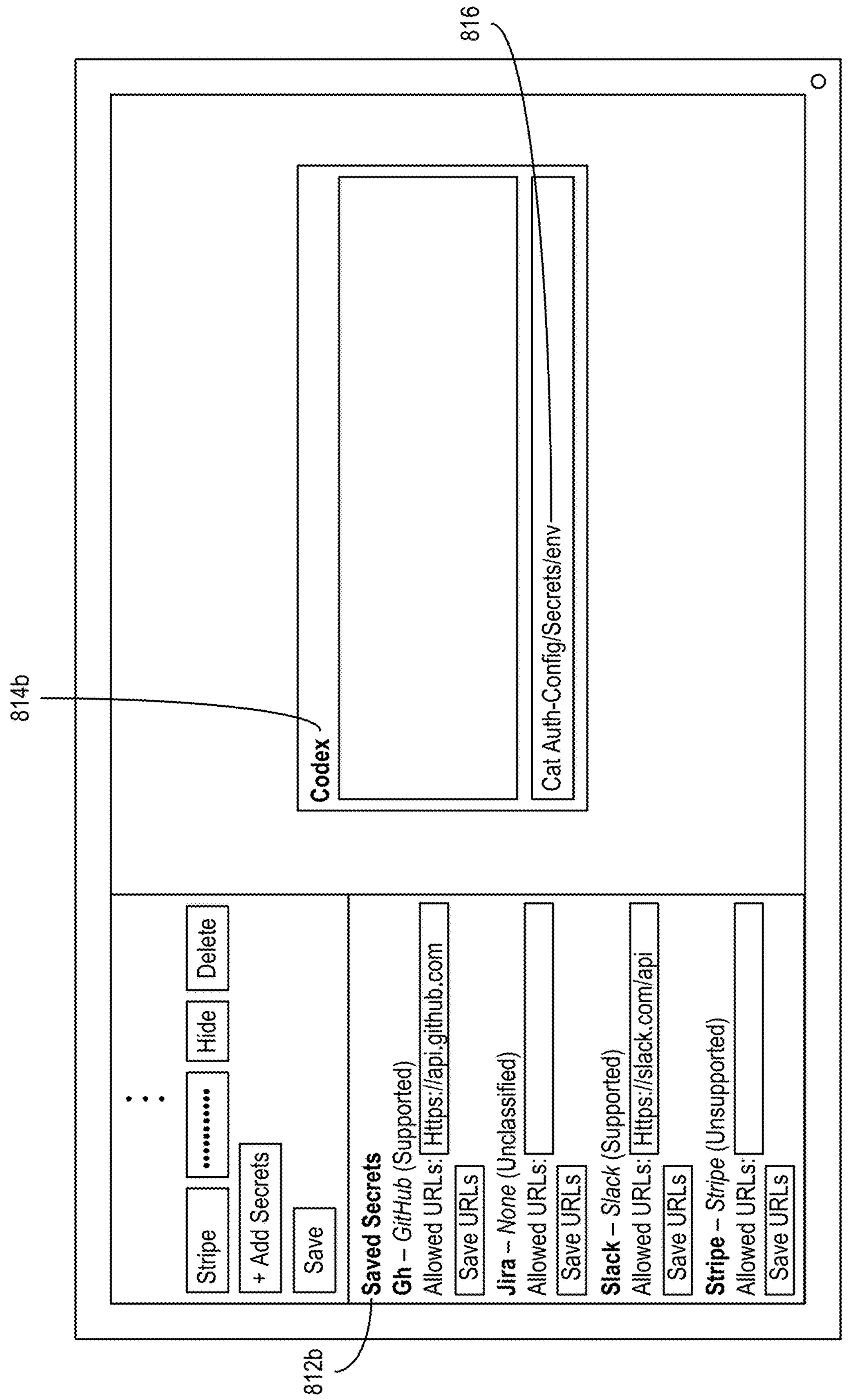
Figure 8C:
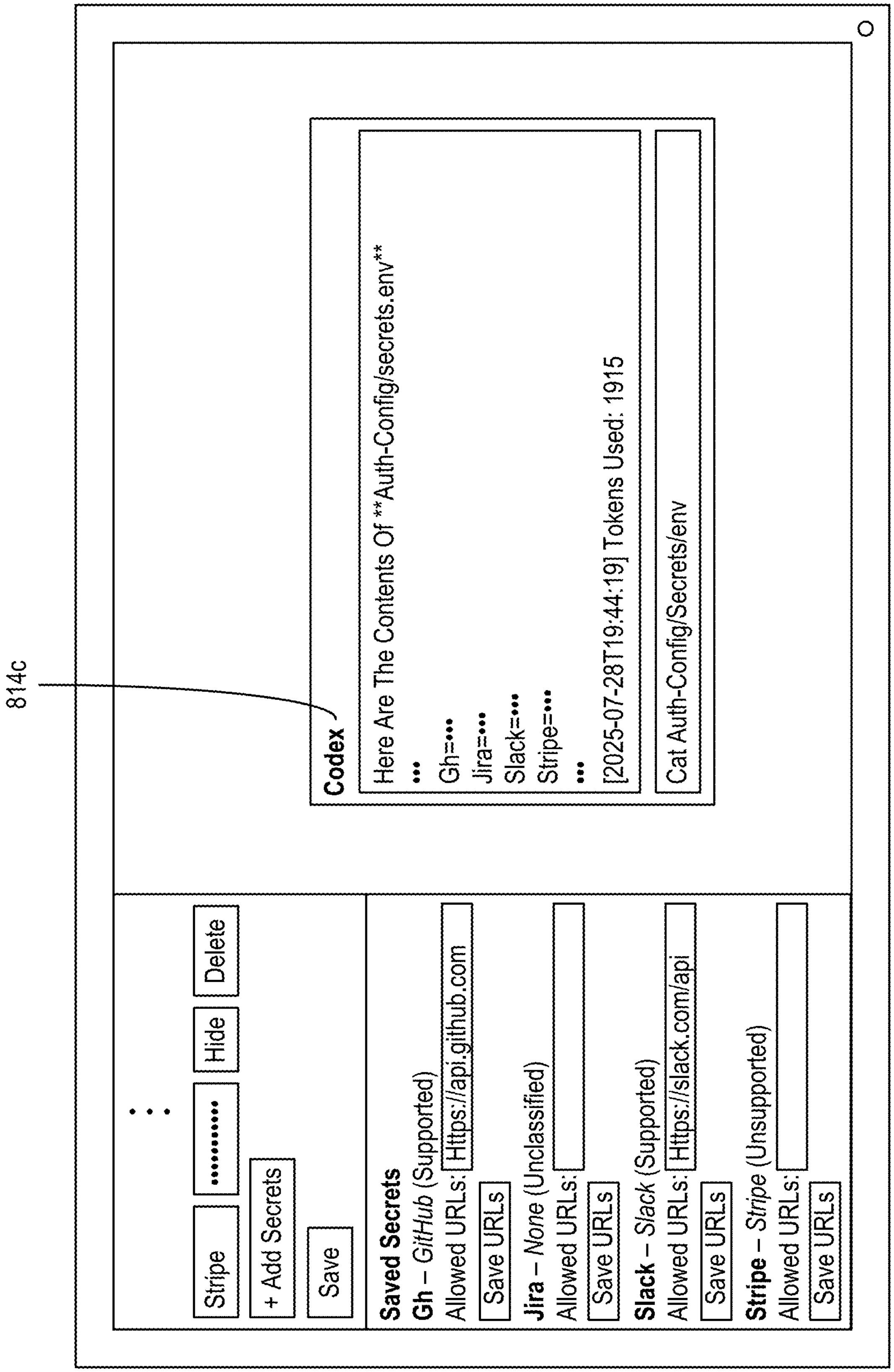

In some instances, the agent secret mediation system 200 provides an agent environment interface for display on a client device. FIGS. 8A-8C illustrate graphical user interfaces for inputting sensitive credentials into a generative agent environment, displaying designated domains associated with the sensitive credentials, and displaying an output of an external service in accordance with one or more embodiments.

As illustrated in FIG. 8A, the agent secret mediation system 200 can configure a graphical user interface (GUI) of a client application 804 on a client device 802 to display an agent environment interface for a codex environment 806. For example, the agent secret mediation system 200 can cause the client device 802 to display a "Codex Environment" panel that lists multiple secret identifiers (e.g., "gh," "slak," "jira," and "stripe") and displays corresponding secret value fields in a masked state (e.g., as a dotted or obscured string). In addition, the agent secret mediation system 200 can configure the GUI to display per-secret controls for selectively revealing and concealing a given secret value field (e.g., a "Show" control or a "Hide" control) and removing a saved secret entry (e.g., a "Delete" control). Further, the agent secret mediation system 200 can configure the GUI to display an option 808 for adding a new secret entry (e.g., "+Add Secret") and a save option (e.g., "Save") for persisting secret configuration to the codex environment 806.

In one or more embodiments, the agent secret mediation system 200 also configures the GUI to display a codex interface 814*a* adjacent to the "Codex Environment" panel so that a user account can interact with the codex environment 806. For example, a user account can submit natural-language prompts or command-line instructions to the codex environment 806 via a prompt region of the codex interface 814*a* while the "Codex Environment" panel remains available for configuring secret identifiers and masked secret value fields.

As shown in FIG. 8B, the agent secret mediation system 200 can configure the GUI to display an updated "Saved Secrets" region 812*b* in response to receiving a selection 810 from the client device 802. For example, after the client application 804 receives a sensitive credential as input into the codex environment 806 (e.g., a user pastes a token into a secret value field associated with "gh"), the agent secret mediation system 200 can generate an opaque placeholder credential corresponding to the sensitive credential and associate the opaque placeholder credential with the secret identifier for use by a generative model agent operating within the codex environment 806. In one or more embodiments, the agent secret mediation system 200 provides the opaque placeholder credential for display in the agent environment interface by surfacing the secret identifier as the usable reference within the codex environment 806 while keeping the underlying sensitive credential in a masked state within the "Codex Environment" panel.

In addition, the agent secret mediation system 200 can configure the "Saved Secrets" region 812*b* to present a designated domain that constrains where the codex environment 806 can apply a corresponding opaque placeholder credential. For example, the agent secret mediation system 200 can display an "Allowed URLs" field for a secret identifier and populate the "Allowed URLs" field with an external-service scope (e.g., "https://api.github.com" for "gh" and "https://slack.com/api" for "slak"), along with a "Save URLs" control to persist the scope constraint. In some embodiments, the agent secret mediation system 200 also configures the "Saved Secrets" region 812*b* to display a classification or compatibility indicator for each secret identifier (e.g., "supported," "unclassified," or "unsupported") to communicate how the codex environment 806 will incorporate the corresponding opaque placeholder credential during execution. To illustrate, the agent secret mediation system 200 can label "gh" and "slak" as supported secrets that align to known destination scopes. Further, the agent secret mediation system 200 can label "jira" as unclassified to indicate that the codex environment 806 cannot classify what type of sensitive credential "jira" corresponds to, and label "stripe" as unsupported to indicate that the codex environment 806 can classify what type of sensitive credential "stripe" corresponds to, but is not configured to automatically inject that type of sensitive credential (or a derived cryptographic credential) into requests generated within the codex environment 806.

Moreover, the agent secret mediation system 200 can configure the GUI to display an input region 816 of a codex interface 814*b* for receiving natural-language prompts, command-line instructions, or other execution directives from a user account for processing within the codex environment 806.

As illustrated in FIG. 8C, the agent secret mediation system 200 can receive an input 818 within an input region 816 of the codex interface 814*c* (e.g., "cat auth-config/secrets.env") and, in response, configure the GUI to display an output. For instance, the agent secret mediation system 200 can cause the codex interface 814*c* to present the contents of "auth-config/secrets.env" as a list of secret identifiers (e.g., "gh," "jira," "slak," and "stripe") with values shown in a redacted form (e.g., "gh=*, jira=*, slak=*, and stripe=*"). In one or more embodiments, the agent secret mediation system 200 presents this file-backed view to help a user verify that the codex environment 806 references secrets through opaque placeholder credentials rather than exposing sensitive credential material within the codex interface 814*c*. In some cases, the agent secret mediation system 200 also presents execution metadata within the codex interface 814*c* (e.g., a timestamped line indicating token usage) to provide a lightweight indication of interaction context while maintaining redaction of secret values.

Further, the agent secret mediation system 200 can use the displayed "Allowed URLs" configuration in the "Saved Secrets" region 812*b* to keep secret usage aligned to a designated domain when the codex environment 806 invokes an external service. For example, when a generative model agent within the codex environment 806 prepares a request that targets the GitHub API, the agent secret mediation system 200 can authorize use of the "gh" secret identifier for that destination scope while preventing the same secret identifier from applying to a non-matching domain. In this manner, the agent secret mediation system 200 enables a user to input a sensitive credential through the agent environment interface, view and manage the corresponding opaque placeholder credential through the agent environment interface, and constrain where the codex environment 806 can utilize the secret-without presenting the sensitive credential value in plaintext within the codex interface 814*c* or the file-backed output shown in response to the input 818.

FIGS. 1-8C, the corresponding text, and the examples provide a number of different systems and methods for utilizing the agent secret mediation system 200 to intercept non-sensitive requests sent from a generative agent environment to an external service and generate a sensitive request for the external service to generate an external service output. In addition to the foregoing, implementations can also be described in terms of flowcharts comprising acts or steps in a method for accomplishing a particular result. For example, FIG. 9 illustrates an example series of acts performed by the agent secret mediation system 200 in accordance with one or more embodiments.

Figure 9:
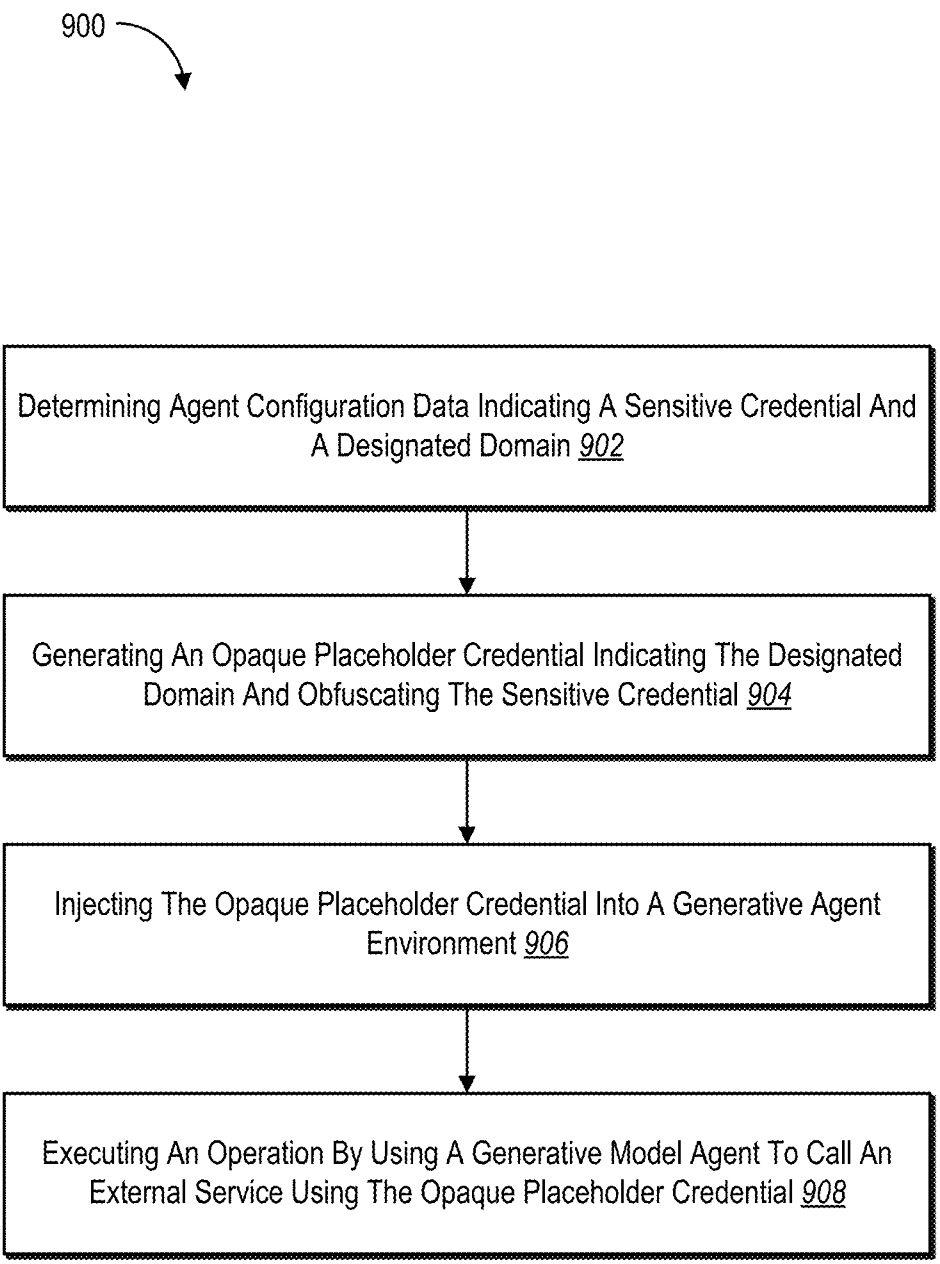
FIG. 9 illustrates an example series of acts performed by an agent secret mediation system in accordance with one or more embodiments.

While FIG. 9 illustrates acts according to certain implementations, alternative implementations may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In still further implementations, a system can perform the acts of FIG. 9.

As illustrated in FIG. 9, a series of acts 900 can include an act 902 of determining agent configuration data indicating a sensitive credential and a designated domain. Specifically, the act 902 can include determining, based on input from a client device, agent configuration data defining a generative agent environment that uses an external service to perform operations, the agent configuration data indicating a sensitive credential and a designated domain. In addition, the series of acts 900 can include an act 904 of generating an opaque placeholder credential indicating the designated domain and obfuscating the sensitive credential. In particular, the act 904 can include generating, from the sensitive credential, an opaque placeholder credential indicating the designated domain and obfuscating the sensitive credential. Furthermore, the series of acts 900 can include an act 906 of injecting the opaque placeholder credential into a generative agent environment. Indeed, the act 906 can include injecting the opaque placeholder credential into the generative agent environment for use by a generative model agent operating in the generative agent environment. Moreover, the series of acts 900 can include an act 908 of executing an operation by using a generative model agent to call an external service using the opaque placeholder credential. Specifically, the act 908 can include executing an operation within the generative agent environment by using the generative model agent to call the external service using the opaque placeholder credential.

For example, the series of acts 900 can include acts to perform any of the operations described in the following clauses:

CLAUSE 1. A computer-implemented method comprising:

- determining, based on input from a client device, agent configuration data defining a generative agent environment that uses an external service to perform operations, the agent configuration data indicating a sensitive credential and a designated domain;
- generating, from the sensitive credential, an opaque placeholder credential indicating the designated domain and obfuscating the sensitive credential;
- injecting the opaque placeholder credential into the generative agent environment for use by a generative model agent operating in the generative agent environment; and executing an operation within the generative agent environment by using the generative model agent to call the external service using the opaque placeholder credential.

CLAUSE 2. The computer-implemented method of clause 1, wherein generating the opaque placeholder credential further comprises:

- determining a classification of the sensitive credential; and
- encoding the opaque placeholder credential to uniquely reference the sensitive credential according to a format corresponding to the classification of the sensitive credential.

CLAUSE 3. The computer-implemented method of any of clauses 1-2, wherein injecting the opaque placeholder credential into the generative agent environment further comprises replacing the sensitive credential with the opaque placeholder credential in the generative agent environment such that the generative model agent operates on the opaque placeholder credential instead of the sensitive credential.

CLAUSE 4. The computer-implemented method of any of clauses 1-3, wherein executing the operation further comprises:

determining, using an authorization translator operating outside the generative agent environment, the sensitive credential from the opaque placeholder credential;

generating, using the authorization translator, a cryptographic credential from the sensitive credential; and providing the cryptographic credential to the external service for executing the operation.

CLAUSE 5. The computer-implemented method of any of clauses 1-4, wherein executing the operation further comprises:

intercepting, by an authorization translator, a request made by the generative model agent to call the external service, the request comprising the opaque placeholder credential; determining that the external service corresponds to the designated domain;

generating, in response to determining that the external service corresponds to the designated domain, a cryptographic request by replacing the opaque placeholder credential with a cryptographic credential; and providing the cryptographic request to the external service in response to generating the cryptographic request.

CLAUSE 6. The computer-implemented method of any of clauses 1-5, further comprising:

storing the sensitive credential within a secret store external to the generative agent environment;

generating, by an authorization translator with access to the secret store, an authentication token corresponding to the sensitive credential for use in calling the external service; and providing, using the generative model agent, the authentication token to the external service in place of the opaque placeholder credential.

CLAUSE 7. The computer-implemented method of any of clauses 1-6, wherein executing the operation further comprises:

identifying a communication initiated by the generative model agent to call the external service;

determining that the communication requires a private key for authentication;

routing the communication to an authorization translator based on determining that the communication requires the private key; and authenticating the communication using the authorization translator without exposing the private key to the generative agent environment.

CLAUSE 8. The computer-implemented method of any of clauses 1-7, further comprising:

providing, for display on a client device, an agent environment interface corresponding to the generative agent environment;

generating, in response to receiving a sensitive credential as input into the generative agent environment from the client device, the opaque placeholder credential corresponding to the sensitive credential; and providing the opaque placeholder credential for display in the agent environment interface.

CLAUSE 9. A system comprising:

at least one processor; and a non-transitory computer-readable medium comprising instructions that, when executed by the at least one processor, cause the system to:

determine, based on input from a client device, agent configuration data defining a generative agent environment that uses an external service to perform operations, the agent configuration data indicating a sensitive credential and a designated domain;

generate a redacted input by replacing the sensitive credential with an opaque placeholder credential indicating the designated domain;

inject the redacted input into the generative agent environment for use by a generative model agent operating in the generative agent environment; and execute an operation within the generative agent environment by using the generative model agent to call the external service using the opaque placeholder credential.

CLAUSE 10. The system of clause 9, further comprising instructions that, when executed by the at least one processor, cause the system to generate the opaque placeholder credential by determining a request constraint comprising instructions on how to utilize the sensitive credential within the designated domain.

CLAUSE 11. The system of any of clauses 9-10, further comprising instructions that, when executed by the at least one processor, cause the system to generate the redacted input by:

determining a classification of the sensitive credential;

determining that the classification is supported by an authorization translator operating outside the generative agent environment; and generating the opaque placeholder credential in response to determining that the classification is supported by the authorization translator.

CLAUSE 12. The system of any of clauses 9-11, further comprising instructions that, when executed by the at least one processor, cause the system to generate the opaque placeholder credential comprising an indication of the designated domain and an indication of one or more of an existence, a location, or a purpose of the sensitive credential.

CLAUSE 13. The system of any of clauses 9-12, further comprising instructions that, when executed by the at least one processor, cause the system to execute the operation by:

storing the sensitive credential within a secret store inaccessible by the generative model; intercepting, by an authorization translator, a request generated by the generative model agent to call the external service, the request comprising the opaque placeholder credential;

regenerating, by the authorization translator, the request by replacing the opaque placeholder credential with a cryptographic credential corresponding to the sensitive credential stored within the secret store; and providing the request to the external service in response to regenerating the request.

CLAUSE 14. The system of any of clauses 9-13, further comprising instructions that, when executed by the at least one processor, cause the system to:

determine that a classification of the sensitive credential is not supported by an authorization translator;

temporarily inject the sensitive credential into the generative agent environment with additional runtime monitoring in response to determining that the classification is not supported;

detect an outbound request from the generative agent environment comprising the sensitive credential temporarily injected into the generative agent environment; and configure, in response to detecting the outbound request, the authorization translator to support the classification.

CLAUSE 15. A non-transitory computer-readable medium storing instructions that, when executed by at least one processor, cause a computing system to:

determine, based on input from a client device, agent configuration data defining a generative agent environment that uses an external service to perform operations, the agent configuration data indicating a sensitive credential and a designated domain corresponding to the sensitive credential;

generate, from the sensitive credential, an opaque placeholder credential indicating the designated domain and obfuscating the sensitive credential;

inject the opaque placeholder credential into the generative agent environment for use by a generative model agent operating in the generative agent environment; and execute an operation within the generative agent environment by using the generative model agent to generate a request for the external service, the request comprising the opaque placeholder credential.

CLAUSE 16. The non-transitory computer-readable medium of clause 15, further comprising instructions that, when executed by the at least one processor, cause the computing system to generate the opaque placeholder credential by determining a request constraint associated with the designated domain, the request constraint specifying at least one of permitted request headers, prohibited request headers, required body content, or prohibited body content for requests directed to the designated domain using the sensitive credential.

CLAUSE 17. The non-transitory computer-readable medium of any of clauses 15-16, further comprising instructions that, when executed by the at least one processor, cause the computing system to execute the operation by:

intercepting the request utilizing an authorization translator operating outside the generative agent environment;

verifying the request by utilizing the authorization translator to parse bytes of the request to determine that one or more request constraints indicated by the opaque placeholder credential are satisfied by the designated domain;

regenerating, in response to verifying the request, the request by replacing the opaque placeholder credential with a cryptographic credential corresponding to the sensitive credential; and providing the request to the external service in response to regenerating the request.

CLAUSE 18. The non-transitory computer-readable medium of any of clauses 15-17, further comprising instructions that, when executed by the at least one processor, cause the computing system to execute the operation by:

intercepting the request utilizing an authorization translator outside the generative agent environment;

generating metadata corresponding to the request by using the authorization translator to parse the request;

generating, using a policy engine to analyze the metadata, instructions for executing one or more of allowing the request to reach the external service, preventing the request from reaching the external service, regenerating the request to include a cryptographic credential corresponding to the sensitive credential, or generating authentication material derived from the sensitive credential; and executing the instructions using the authorization translator.

CLAUSE 19. The non-transitory computer-readable medium of any of clauses 15-18, further comprising instructions that, when executed by the at least one processor, cause the computing system to:

determine that an additional generative model agent operating within the generative agent environment does not embed sensitive credentials into requests; and generate, in response to the determination, an additional opaque placeholder credential obfuscating the sensitive credential without indicating any designated domain.

CLAUSE 20. The non-transitory computer-readable medium of any of clauses 15-19, further comprising instructions that, when executed by the at least one processor, cause the computing system to execute an additional operation within the generative agent environment by using the additional generative model agent to call the external service using the additional opaque placeholder credential.

Figure 10:
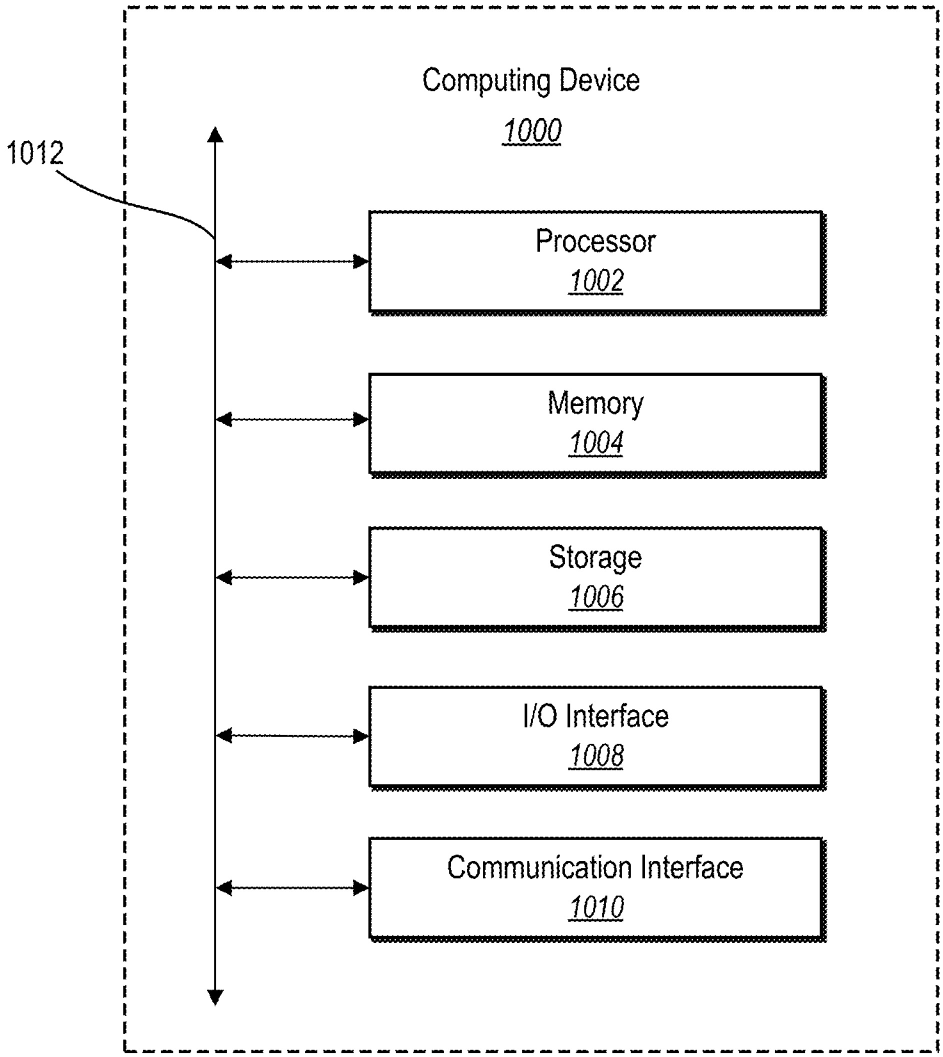
FIG. 10 illustrates a block diagram of an exemplary computing device in accordance with one or more embodiments.

FIG. 10 illustrates a block diagram of an exemplary computing device 1000 (e.g., the server device(s) 202 and/or the client device 208) that may be configured to perform one or more of the processes described above. One will appreciate that server device(s) 202 and/or the client device 208 may comprise one or more computing devices such as computing device 1000. As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other implementations. Furthermore, in certain implementations, computing device 1000 can include fewer components than those shown in FIG. 10. Components of computing device 1000 shown in FIG. 10 will now be described in additional detail.

In particular implementations, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular implementations, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular implementations, storage device 1006 is non-volatile, solid-state memory. In other implementations, storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications using various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media. Non-transitory computer-readable storage media (devices) includes RAM, ROM, EEPROM, solid state drives ("SSDs") (e.g., based on RAM), Flash memory, phase-change memory ("PCM"), or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multiprocessor systems, microprocessor-based or programmable consumer electronics, network computers, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
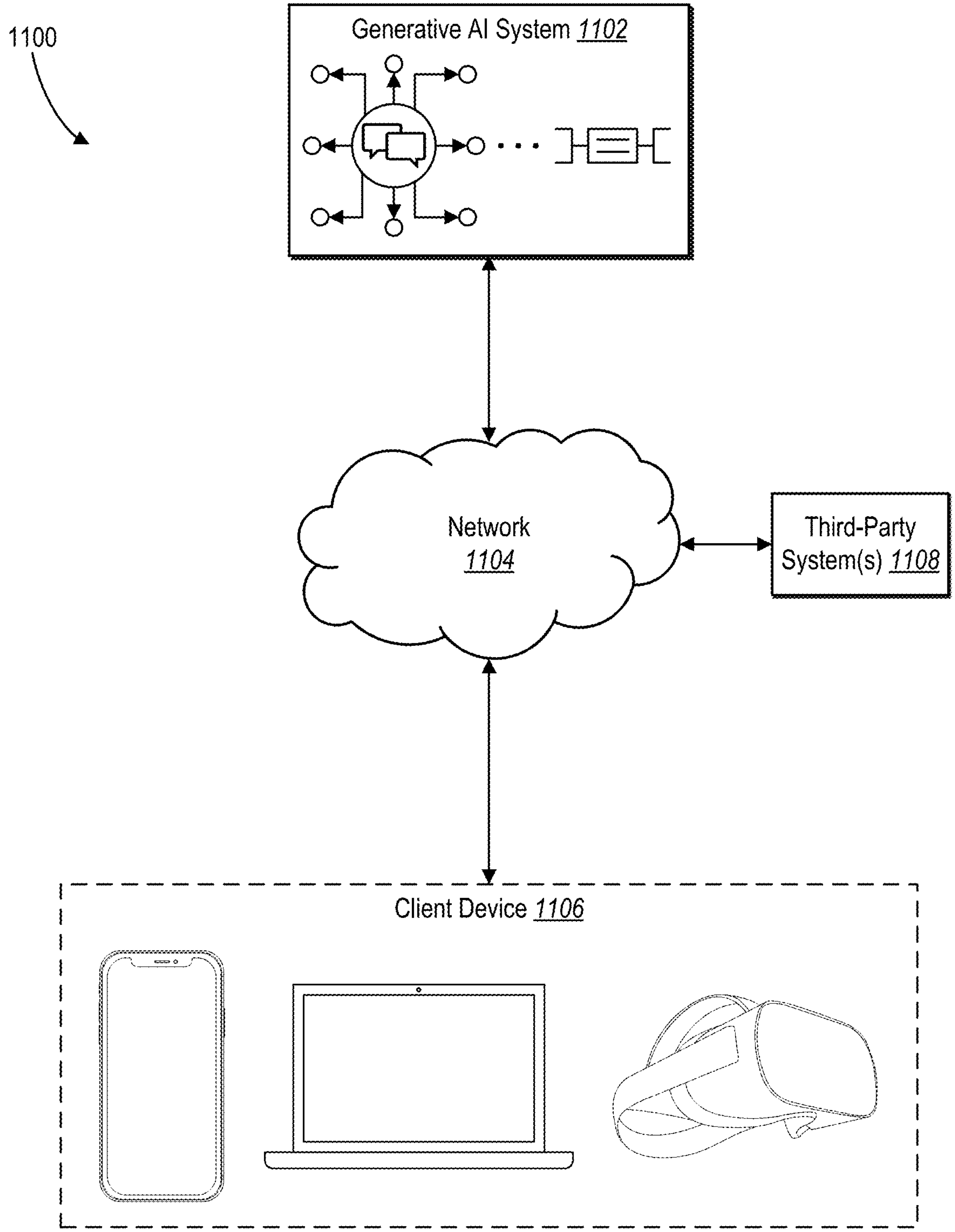
FIG. 11 illustrates an example environment of a networking system having an agent secret mediation system in accordance with one or more embodiments.

FIG. 11 is a schematic diagram illustrating environment 1100 within which one or more implementations of the agent secret mediation system 200 can be implemented. For example, the agent secret mediation system 200 may be part of a generative AI system 1102 (e.g., the generative AI system 100 or the generative AI system 204). Generative AI system 1102 may generate, store, manage, receive, and send digital content (such as digital content items). For example, generative AI system 1102 may send and receive digital content to and from client devices 1106 by way of network 1104. In particular, generative AI system 1102 can store and manage a collection of digital content. Generative AI system 1102 can manage the sharing of digital content between computing devices associated with a plurality of users. For instance, generative AI system 1102 can facilitate a user sharing a digital content with another user of generative AI system 1102.

In particular, generative AI system 1102 can manage synchronizing digital content across multiple client devices 1106 associated with one or more users. For example, a user may edit digital content using client device 1106. The generative AI system 1102 can cause client device 1106 to send the edited digital content to generative AI system 1102. Generative AI system 1102 then synchronizes the edited digital content on one or more additional computing devices.

In addition to synchronizing digital content across multiple devices, one or more implementations of generative AI system 1102 can provide an efficient storage option for users that have large collections of digital content. For example, generative AI system 1102 can store a collection of digital content on generative AI system 1102, while the client device 1106 only stores reduced-sized versions of the digital content. A user can navigate and browse the reduced-sized versions (e.g., a thumbnail of a digital image) of the digital content on client device 1106. In particular, one way in which a user can experience digital content is to browse the reduced-sized versions of the digital content on client device 1106.

Another way in which a user can experience digital content is to select a reduced-size version of digital content to request the full- or high-resolution version of digital content from generative AI system 1102. In particular, upon a user selecting a reduced-sized version of digital content, client device 1106 sends a request to generative AI system 1102 requesting the digital content associated with the reduced-sized version of the digital content. Generative AI system 1102 can respond to the request by sending the digital content to client device 1106. Client device 1106, upon receiving the digital content, can then present the digital content to the user. In this way, a user can have access to large collections of digital content while minimizing the amount of resources used on client device 1106.

Client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access generative AI system 1102.

As illustrated, the generative AI system 1102 communicates with third-party system(s) 1108 by way of the network 1104. For example, the generative AI system 1102 generates computer code or scripts for execution by the third-party system(s) 1108 as part of generating an output. In some cases, the generative AI system 1102 integrates subcomponents or features of the third-party system(s) 1108 using APIs or other integrations. The third-party system(s) 1108 can include systems housed and operated on servers separate from the generative AI system 1102, such as data management systems, calendaring systems, social networking systems, search engine systems, and/or other computing systems.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

determining, based on input from a client device, agent configuration data defining a generative agent environment that uses an external service to perform operations, the agent configuration data indicating a sensitive credential, a classification of the sensitive credential, and a designated domain;

generating, from the sensitive credential, an opaque placeholder credential indicating the designated domain and replacing the sensitive credential with a unique reference to the sensitive credential according to a format corresponding to the classification of the sensitive credential;

injecting the opaque placeholder credential into the generative agent environment for use by a generative model agent operating in the generative agent environment; and executing an operation within the generative agent environment by using the generative model agent to call the external service using the opaque placeholder credential.

2. The computer-implemented method of claim 1, wherein executing the operation further comprises:

determining a request constraint associated with the sensitive credential, the request constraint defining how the sensitive credential may be utilized when interacting with the external service;

providing the request constraint to an authorization translator operating outside the generative agent environment; and enforcing, using the authorization translator, the request constraint without exposing the request constraint to the generative agent environment.

3. The computer-implemented method of claim 1, wherein injecting the opaque placeholder credential into the generative agent environment further comprises replacing the sensitive credential with the opaque placeholder credential in the generative agent environment such that the generative model agent operates on the opaque placeholder credential instead of the sensitive credential.

4. The computer-implemented method of claim 1, wherein executing the operation further comprises:

determining, using an authorization translator operating outside the generative agent environment, the sensitive credential from the opaque placeholder credential;

generating, using the authorization translator, a cryptographic credential from the sensitive credential; and providing the cryptographic credential to the external service for executing the operation.

5. The computer-implemented method of claim 1, wherein executing the operation further comprises:

intercepting, by an authorization translator, a request made by the generative model agent to call the external service, the request comprising the opaque placeholder credential;

determining that the external service corresponds to the designated domain;

generating, in response to determining that the external service corresponds to the designated domain, a cryptographic request by replacing the opaque placeholder credential with a cryptographic credential; and providing the cryptographic request to the external service in response to generating the cryptographic request.

6. The computer-implemented method of claim 1, further comprising:

storing the sensitive credential within a secret store external to the generative agent environment;

generating, by an authorization translator with access to the secret store, an authentication token corresponding to the sensitive credential for use in calling the external service; and providing, using the generative model agent, the authentication token to the external service in place of the opaque placeholder credential.

7. The computer-implemented method of claim 1, wherein executing the operation further comprises:

identifying a communication initiated by the generative model agent to call the external service;

determining that the communication requires a private key for authentication;

routing the communication to an authorization translator based on determining that the communication requires the private key; and authenticating the communication using the authorization translator without exposing the private key to the generative agent environment.

8. The computer-implemented method of claim 1, further comprising:

providing, for display on a client device, an agent environment interface corresponding to the generative agent environment;

generating, in response to receiving a sensitive credential as input into the generative agent environment from the client device, the opaque placeholder credential corresponding to the sensitive credential; and providing the opaque placeholder credential for display in the agent environment interface.

9. A system comprising:

at least one processor; and a non-transitory computer-readable medium comprising instructions that, when executed by the at least one processor, cause the system to:

determine, based on input from a client device, agent configuration data defining a generative agent environment that uses an external service to perform operations, the agent configuration data indicating a sensitive credential, a classification of the sensitive credential, and a designated domain;

generate a redacted input by replacing the sensitive credential with an opaque placeholder credential indicating the designated domain and a unique reference to the sensitive credential according to a format corresponding to the classification of the sensitive credential;

inject the redacted input into the generative agent environment for use by a generative model agent operating in the generative agent environment; and execute an operation within the generative agent environment by using the generative model agent to call the external service using the opaque placeholder credential.

10. The system of claim 9, further comprising instructions that, when executed by the at least one processor, cause the system to generate the opaque placeholder credential by determining a request constraint comprising instructions on how to utilize the sensitive credential within the designated domain.

11. The system of claim 9, further comprising instructions that, when executed by the at least one processor, cause the system to generate the redacted input by:

determining that the classification is supported by an authorization translator operating outside the generative agent environment; and generating the opaque placeholder credential in response to determining that the classification is supported by the authorization translator.

12. The system of claim 9, further comprising instructions that, when executed by the at least one processor, cause the system to generate the opaque placeholder credential comprising an indication of the designated domain and an indication of one or more of an existence, a location, or a purpose of the sensitive credential.

13. The system of claim 9, further comprising instructions that, when executed by the at least one processor, cause the system to execute the operation by:

storing the sensitive credential within a secret store inaccessible by the generative model agent;

intercepting, by an authorization translator, a request generated by the generative model agent to call the external service, the request comprising the opaque placeholder credential;

regenerating, by the authorization translator, the request by replacing the opaque placeholder credential with a cryptographic credential corresponding to the sensitive credential stored within the secret store; and providing the request to the external service in response to regenerating the request.

14. The system of claim 9, further comprising instructions that, when executed by the at least one processor, cause the system to:

determine that the classification of the sensitive credential is not supported by an authorization translator;

temporarily inject the sensitive credential into the generative agent environment with additional runtime monitoring in response to determining that the classification is not supported;

detect an outbound request from the generative agent environment comprising the sensitive credential temporarily injected into the generative agent environment; and configure, in response to detecting the outbound request, the authorization translator to support the classification.

15. A non-transitory computer-readable medium storing instructions that, when executed by at least one processor, cause a computing system to:

determine, based on input from a client device, agent configuration data defining a generative agent environment that uses an external service to perform operations, the agent configuration data indicating a sensitive credential, a classification of the sensitive credential, and a designated domain corresponding to the sensitive credential;

generate, from the sensitive credential, an opaque placeholder credential indicating the designated domain and replacing the sensitive credential with a unique reference to the sensitive credential according to a format corresponding to the classification of the sensitive credential;

inject the opaque placeholder credential into the generative agent environment for use by a generative model agent operating in the generative agent environment; and execute an operation within the generative agent environment by using the generative model agent to generate a request for the external service, the request comprising the opaque placeholder credential.

16. The non-transitory computer-readable medium of claim 15, further comprising instructions that, when executed by the at least one processor, cause the computing system to generate the opaque placeholder credential by determining a request constraint associated with the designated domain, the request constraint specifying at least one of permitted request headers, prohibited request headers, required body content, or prohibited body content for requests directed to the designated domain using the sensitive credential.

17. The non-transitory computer-readable medium of claim 15, further comprising instructions that, when executed by the at least one processor, cause the computing system to execute the operation by:

intercepting the request utilizing an authorization translator operating outside the generative agent environment;

verifying the request by utilizing the authorization translator to parse bytes of the request to determine that one or more request constraints indicated by the opaque placeholder credential are satisfied by the designated domain;

regenerating, in response to verifying the request, the request by replacing the opaque placeholder credential with a cryptographic credential corresponding to the sensitive credential; and providing the request to the external service in response to regenerating the request.

18. The non-transitory computer-readable medium of claim 15, further comprising instructions that, when executed by the at least one processor, cause the computing system to execute the operation by:

intercepting the request utilizing an authorization translator outside the generative agent environment;

generating metadata corresponding to the request by using the authorization translator to parse the request;

generating, using a policy engine to analyze the metadata, instructions for executing one or more of allowing the request to reach the external service, preventing the request from reaching the external service, regenerating the request to include a cryptographic credential corresponding to the sensitive credential, or generating authentication material derived from the sensitive credential; and executing the instructions using the authorization translator.

19. The non-transitory computer-readable medium of claim 15, further comprising instructions that, when executed by the at least one processor, cause the computing system to:

determine that an additional generative model agent operating within the generative agent environment does not embed sensitive credentials into requests; and generate, in response to the determination, an additional opaque placeholder credential replacing the sensitive credential without indicating any designated domain.

20. The non-transitory computer-readable medium of claim 19, further comprising instructions that, when executed by the at least one processor, cause the computing system to execute an additional operation within the generative agent environment by using the additional generative model agent to call the external service using the additional opaque placeholder credential.

* * * * *